US012610045B2

(12) United States Patent
　　Choi et al.

(10) Patent No.:　US 12,610,045 B2
(45) **Date of Patent:　\*Apr. 21, 2026**

(54) VIDEO ENCODING METHOD AND DEVICE FOR PERFORMING POST-RECONSTRUCTION FILTERING IN CONSTRAINED PREDICTION MODE, AND VIDEO DECODING METHOD AND DEVICE

(71) Applicant: SAMSUNG ELECTRONICS CO., LTD., Suwon-si (KR)

(72) Inventors: Narae Choi, Suwon-si (KR); Minwoo Park, Suwon-si (KR); Minsoo Park, Suwon-si (KR)

(73) Assignee: SAMSUNG ELECTRONICS CO., LTD., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/787,639

(22) Filed: Jul. 29, 2024

(65) Prior Publication Data

US 2024/0388703 A1　　Nov. 21, 2024

Related U.S. Application Data

(63) Continuation of application No. 17/551,483, filed on Dec. 15, 2021, now Pat. No. 12,081,745, which is a
(Continued)

(51) Int. Cl.
H04N 19/117　　(2014.01)
H04N 19/107　　(2014.01)
(Continued)

(52) U.S. Cl.
CPC ......... H04N 19/117 (2014.11); H04N 19/107 (2014.11); H04N 19/132 (2014.11);
(Continued)

(58) Field of Classification Search
CPC .... H04N 19/176; H04N 19/17; H04N 19/172; H04N 19/174; H04N 19/117;
(Continued)

(56) References Cited

U.S. PATENT DOCUMENTS 9,596,461 B2 \*　3/2017　Chong ................... H04N 19/30
10,602,169 B2　　3/2020　Lee et al.
(Continued)

FOREIGN PATENT DOCUMENTS

CN　　　109565593　A　　4/2019
CN　　　109691099　A　　4/2019
(Continued)

OTHER PUBLICATIONS

Communication dated Feb. 6, 2024, issued by the Korean Patent Office in Korean Application No. 10-2021-7041942.
(Continued)

*Primary Examiner* — Nathnael Aynalem
(74) *Attorney, Agent, or Firm* — Sughrue Mion, PLLC

(57)　　　　ABSTRACT

Provided is a video decoding method including: obtaining constrained prediction information indicating whether a constrained intra prediction mode is enabled; generating reconstructed samples of a current block by using prediction samples of the current block and residual samples of the current block; when the constrained intra prediction mode is enabled by the constrained prediction information and a prediction mode of a neighboring block is not an intra prediction mode, determining a padding value corresponding to a neighboring sample adjacent to outside of a boundary between the current block and the neighboring block, by using the reconstructed samples of the current block; and performing post-reconstruction filtering on the current block, by using the padding value corresponding to the neighboring sample.

3 Claims, 31 Drawing Sheets

Related U.S. Application Data continuation of application No. PCT/KR2020/008080, filed on Jun. 22, 2020.

(60) Provisional application No. 62/971,485, filed on Feb. 7, 2020, provisional application No. 62/864,816, filed on Jun. 21, 2019.

(51) Int. Cl.

| | |
|---|---|
| *H04N 19/132* | (2014.01) |
| *H04N 19/159* | (2014.01) |
| *H04N 19/176* | (2014.01) |
| *H04N 19/196* | (2014.01) |
| *H04N 19/503* | (2014.01) |
| *H04N 19/593* | (2014.01) |
| *H04N 19/61* | (2014.01) |
| *H04N 19/82* | (2014.01) |

(52) U.S. Cl.
CPC ......... *H04N 19/159* (2014.11); *H04N 19/176* (2014.11); *H04N 19/196* (2014.11); *H04N 19/503* (2014.11); *H04N 19/593* (2014.11); *H04N 19/61* (2014.11); *H04N 19/82* (2014.11)

(58) Field of Classification Search
CPC .. H04N 19/103; H04N 19/105; H04N 19/107; H04N 19/109; H04N 19/11; H04N 19/159; H04N 19/61; H04N 19/50; H04N 19/503; H04N 19/593; H04N 19/46; H04N 19/196; H04N 19/119; H04N 19/182; H04N 19/82; H04N 19/80; H04N 19/132; H04N 19/18; H04N 19/12; H04N 19/625; H04N 19/70
USPC ............................................ 375/240–240.29
See application file for complete search history.

(56) References Cited

U.S. PATENT DOCUMENTS

| | | | |
|---|---|---|---|
| 10,659,812 B2 | 5/2020 | Jin et al. | |
| 2014/0146875 A1 | 5/2014 | Chong et al. | |
| 2015/0146779 A1 | 5/2015 | Bang et al. | |
| 2015/0358623 A1* | 12/2015 | Li | ........................ H04N 19/164 |
| | | | 375/240.02 |
| 2016/0360210 A1 | 12/2016 | Xiu et al. | |
| 2018/0184126 A1 | 6/2018 | Zhang et al. | |
| 2018/0184127 A1* | 6/2018 | Zhang | .................... H04N 19/82 |
| 2018/0338161 A1 | 11/2018 | Zhai et al. | |
| 2019/0208199 A1 | 7/2019 | Cho et al. | |
| 2019/0253622 A1* | 8/2019 | Van der Auwera | .... H04N 19/86 |
| 2020/0112736 A1* | 4/2020 | Rusanovskyy | ...... H04N 19/117 |

| | | | |
|---|---|---|---|
| 2021/0105465 A1 | 4/2021 | Choi et al. | |
| 2022/0116597 A1* | 4/2022 | Ikonin | .................. H04N 19/176 |
| 2023/0421778 A1 | 12/2023 | Jun et al. | |
| 2024/0171768 A1 | 5/2024 | Piao et al. | |

FOREIGN PATENT DOCUMENTS

| | | | |
|---|---|---|---|
| KR | 1020120125193 A | 11/2012 | |
| KR | 1020150090172 A | 8/2015 | |
| KR | 1020150099496 A | 8/2015 | |
| WO | 2017/090993 A1 | 6/2017 | |
| WO | 2019/066174 A1 | 4/2019 | |
| WO | 2019216712 A1 | 11/2019 | |

OTHER PUBLICATIONS

Communication dated Sep. 14, 2023 issued by the Indian Patent Office in counterpart Indian Application No. 202147058908.
International Search Report (PCT/ISA/210) dated Sep. 25, 2020 issued by the International Searching Authority in application No. PCT/KR2020/008080.
Jacob Ström et al., "Bilateral Filter After Inverse Transform", Joint Video Experts Team (JVET) of ITU-T SG 16 WP 3 and ISO/IEC JTC 1/SC 29/WG 11, 4th Meeting, Document: JVET-D0069, Source: Ericsson, Oct. 25, 2016, 5 pages, XP030247464.
The Extended European Search Report issued on Jun. 16, 2023 by the European Patent Office for European Patent Application No. 20826299.8.
Victor Stepin et al., "CE2 related: Hadamard Transform Domain Filter", Joint Video Experts Team (JVET) of ITU-T SG 16 WP 3 and ISO/IEC JTC 1/SC 29/WG 11, 11th Meeting, Document: JVET-K0068-v3, Source: Huawei Technologies Co., Ltd., Aug. 1, 2018, 5 pages, XP030193510.
Communication issued Jan. 27, 2025 the China National Intellectual Property Administration in Chinese Patent Application No. 202080057504.0.
Communication issued Dec. 9, 2024 by the Intellectual Property Office of India in Indian Patent Application No. 202147058908.
Communication issued Jan. 8, 2025 by the Intellectual Property Office of India in Indian Patent Application No. 202147058908.
Communication issued Feb. 10, 2025 by the Intellectual Property Office of India in Indian Patent Application No. 202147058908.
Communication issued Oct. 10, 2024 by the Korean Patent Office for KR Patent Application No. 10-2021-7041942.
Office Action issued on Jul. 30, 2024 by the Chinese Patent Office in corresponding CN Patent Application No. 202080057504.0.
Office Action issued on Sep. 9, 2024 by the Vietnam Patent Office in corresponding VN Patent Application No. 1-2022-00387.
Office Action dated Apr. 18, 2025, issued by Malaysian Patent Office in Malaysian Patent Application No. PI2021007598.
Communication issued on Jan. 23, 2026 by the European Patent Office in European Patent Application No. 20826299.8.

* cited by examiner

FIG. 4
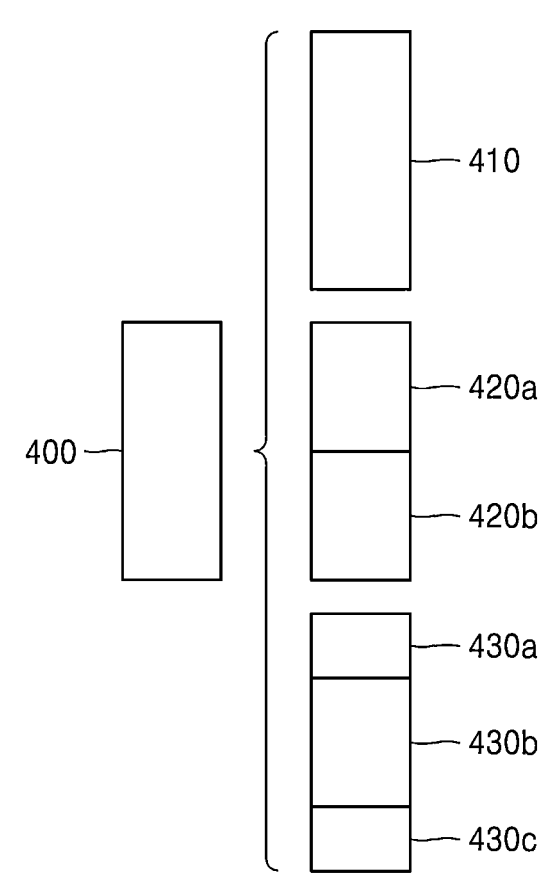
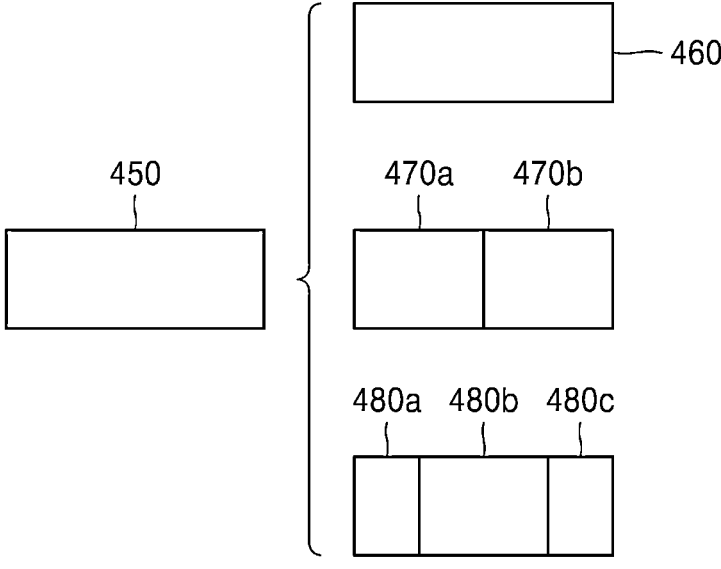

FIG. 6
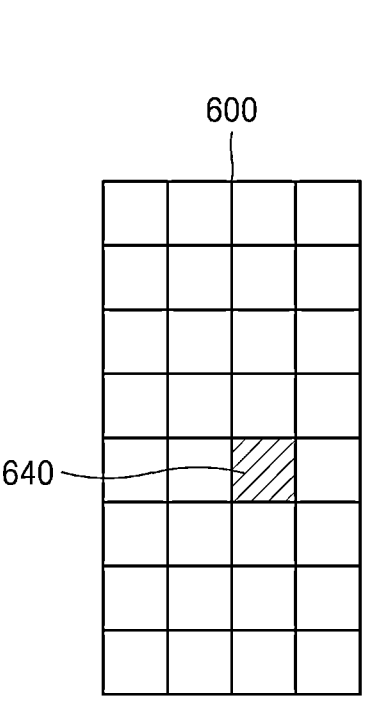
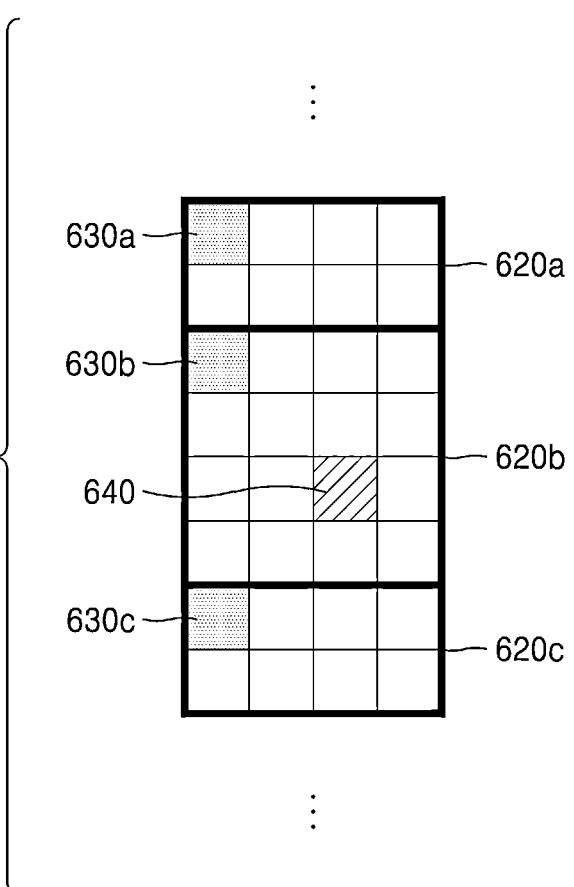
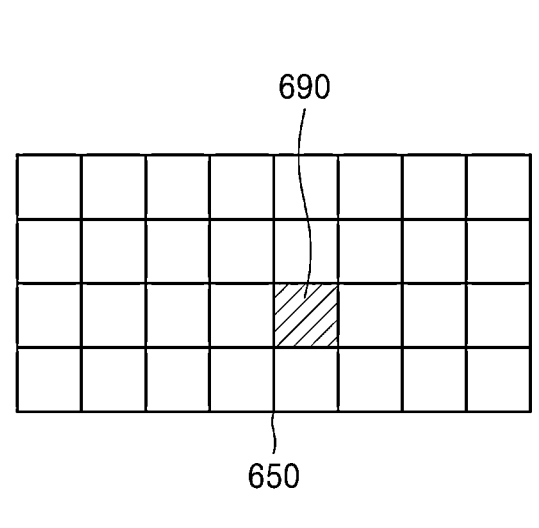
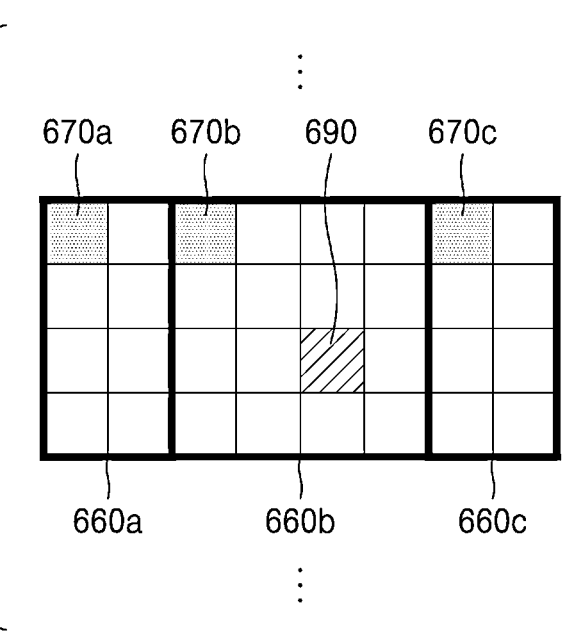

| BLOCK SHAPE DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

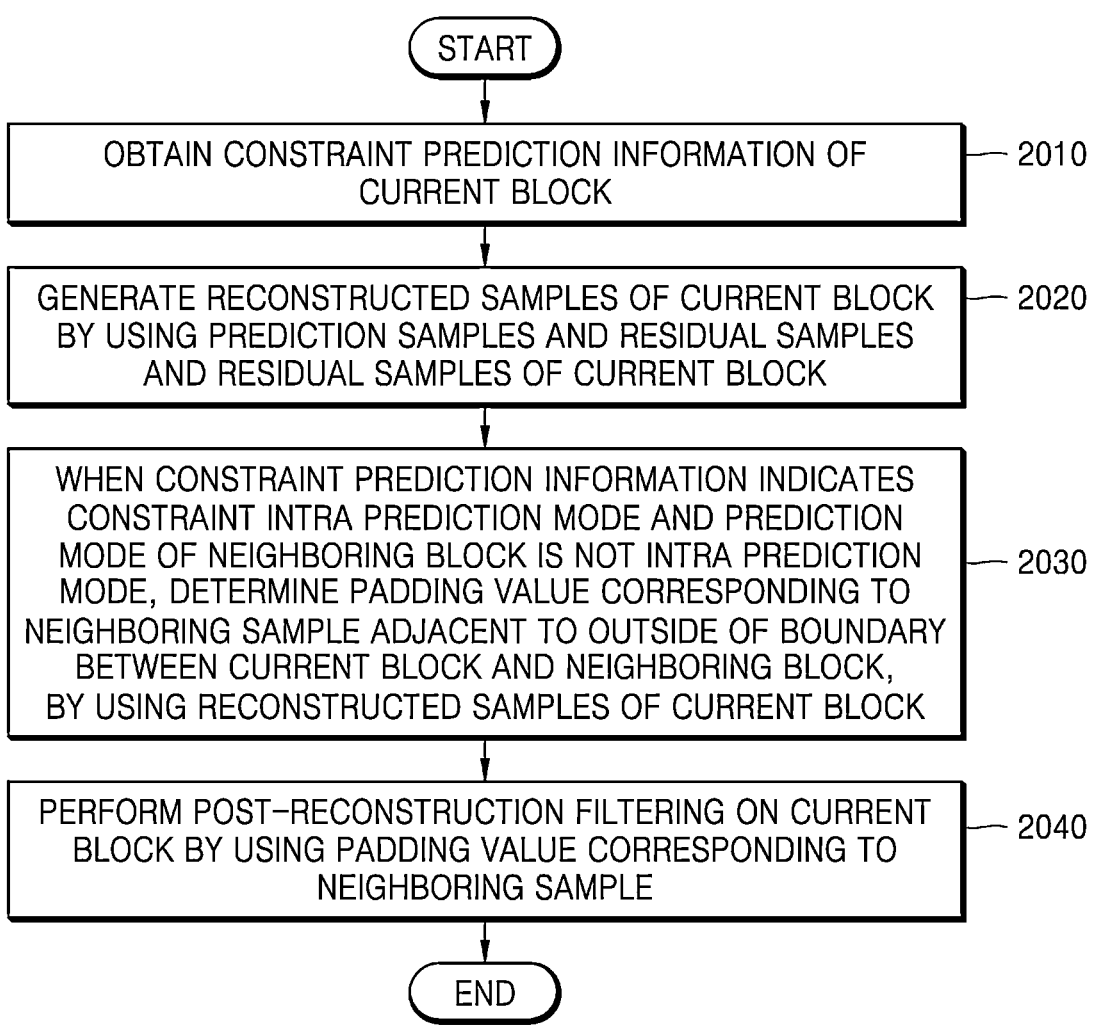

START

OBTAIN CONSTRAINT PREDICTION INFORMATION OF CURRENT BLOCK ⎯ 2010

GENERATE RECONSTRUCTED SAMPLES OF CURRENT BLOCK BY USING PREDICTION SAMPLES AND RESIDUAL SAMPLES AND RESIDUAL SAMPLES OF CURRENT BLOCK ⎯ 2020

WHEN CONSTRAINT PREDICTION INFORMATION INDICATES CONSTRAINT INTRA PREDICTION MODE AND PREDICTION MODE OF NEIGHBORING BLOCK IS NOT INTRA PREDICTION MODE, DETERMINE PADDING VALUE CORRESPONDING TO NEIGHBORING SAMPLE ADJACENT TO OUTSIDE OF BOUNDARY BETWEEN CURRENT BLOCK AND NEIGHBORING BLOCK, BY USING RECONSTRUCTED SAMPLES OF CURRENT BLOCK ⎯ 2030

PERFORM POST-RECONSTRUCTION FILTERING ON CURRENT BLOCK BY USING PADDING VALUE CORRESPONDING TO NEIGHBORING SAMPLE ⎯ 2040

END

FIG. 23

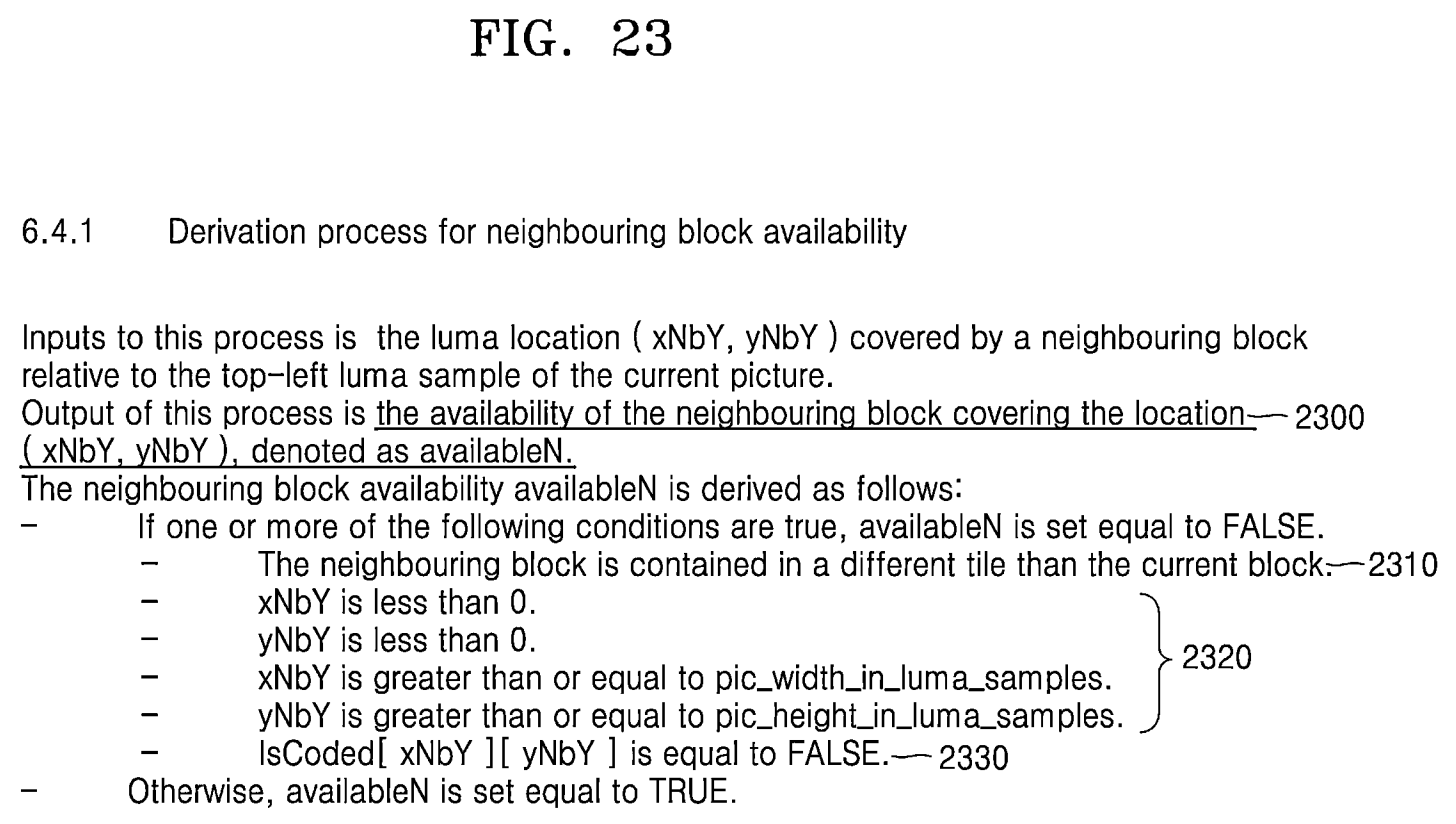

6.4.1      Derivation process for neighbouring block availability

Inputs to this process is  the luma location ( xNbY, yNbY ) covered by a neighbouring block relative to the top-left luma sample of the current picture.

Output of this process is the availability of the neighbouring block covering the location— 2300 ( xNbY, yNbY ), denoted as availableN.

The neighbouring block availability availableN is derived as follows:

— If one or more of the following conditions are true, availableN is set equal to FALSE.

— The neighbouring block is contained in a different tile than the current block.—2310

— xNbY is less than 0.

— yNbY is less than 0.

— xNbY is greater than or equal to pic_width_in_luma_samples.

— yNbY is greater than or equal to pic_height_in_luma_samples.

— IsCoded[ xNbY ][ yNbY ] is equal to FALSE.— 2330

} 2320

— Otherwise, availableN is set equal to TRUE.

FIG. 24

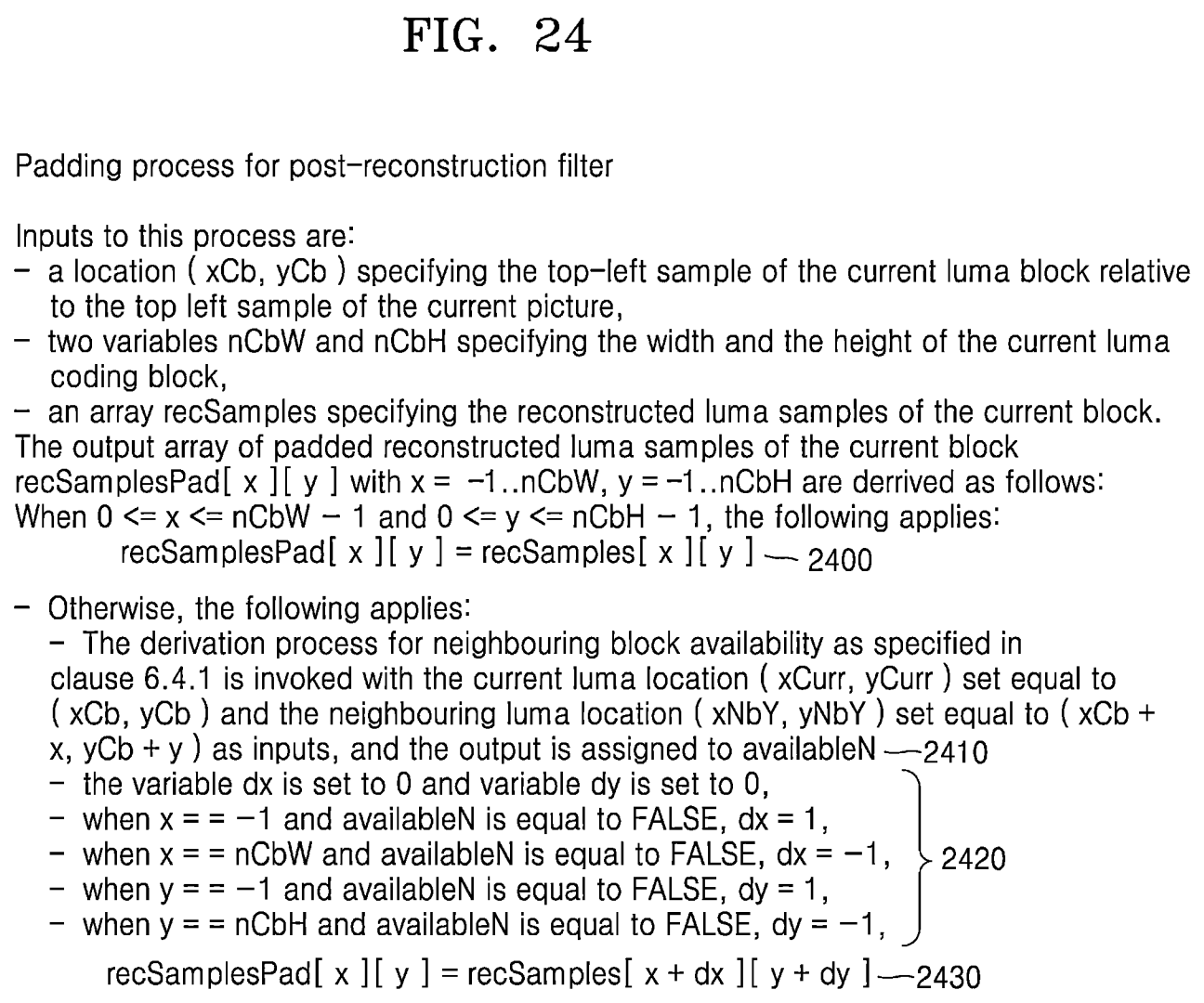

Padding process for post-reconstruction filter

Inputs to this process are:

− a location ( xCb, yCb ) specifying the top-left sample of the current luma block relative to the top left sample of the current picture, − two variables nCbW and nCbH specifying the width and the height of the current luma coding block, − an array recSamples specifying the reconstructed luma samples of the current block.

The output array of padded reconstructed luma samples of the current block recSamplesPad[ x ][ y ] with x = −1..nCbW, y = −1..nCbH are derived as follows:

When $0 <= x <= nCbW − 1$ and $0 <= y <= nCbH − 1$, the following applies:

recSamplesPad[ x ][ y ] = recSamples[ x ][ y ] ─ 2400

− Otherwise, the following applies:

− The derivation process for neighbouring block availability as specified in clause 6.4.1 is invoked with the current luma location ( xCurr, yCurr ) set equal to ( xCb, yCb ) and the neighbouring luma location ( xNbY, yNbY ) set equal to ( xCb + x, yCb + y ) as inputs, and the output is assigned to availableN ─2410

− the variable dx is set to 0 and variable dy is set to 0,

− when x = = −1 and availableN is equal to FALSE, dx = 1,

− when x = = nCbW and availableN is equal to FALSE, dx = −1,  ⎫

− when y = = −1 and availableN is equal to FALSE, dy = 1,  ⎬ 2420

− when y = = nCbH and availableN is equal to FALSE, dy = −1,  ⎭ recSamplesPad[ x ][ y ] = recSamples[ x + dx ][ y + dy ] ─2430

FIG. 25

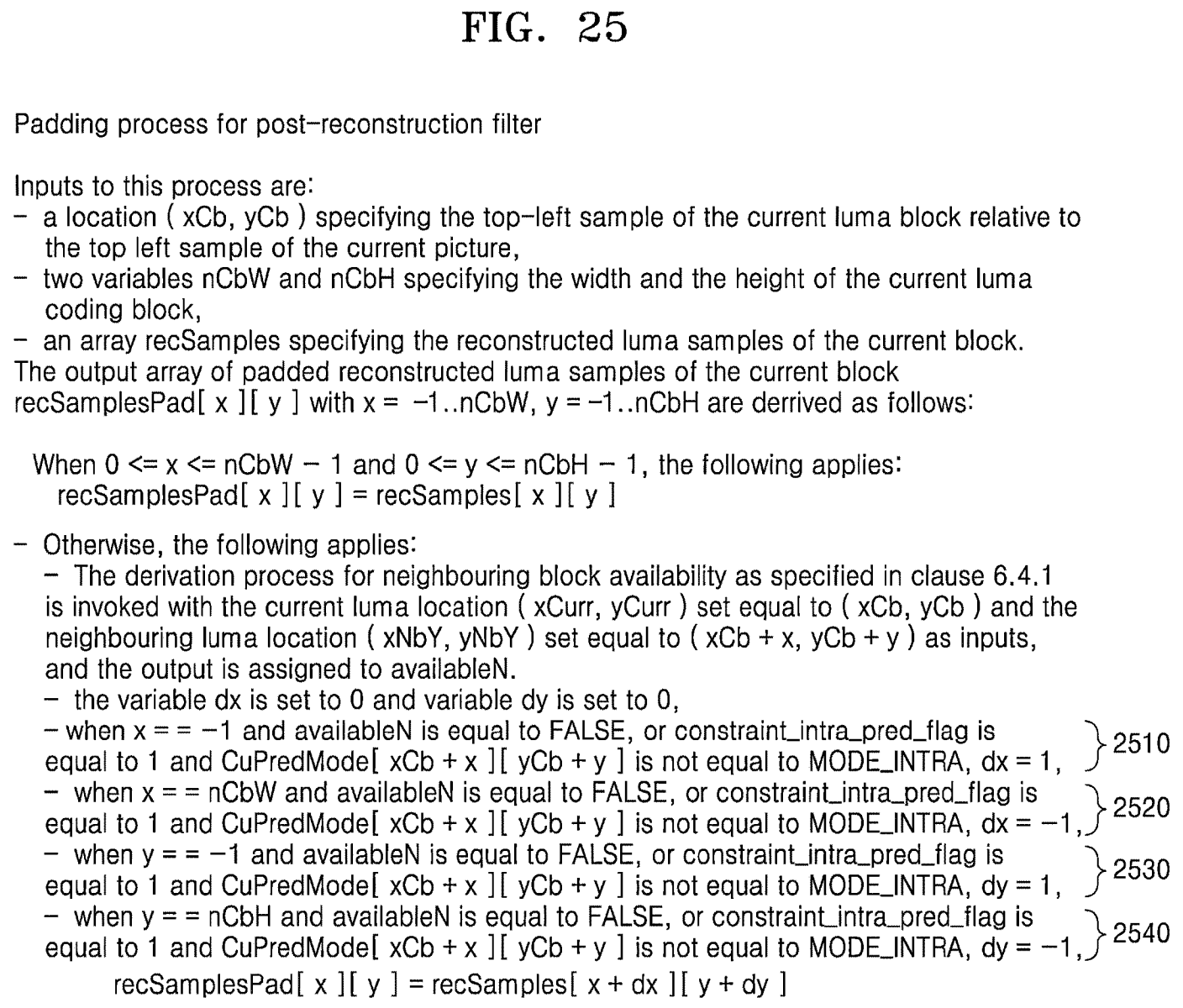

Padding process for post-reconstruction filter

Inputs to this process are:
- a location ( xCb, yCb ) specifying the top-left sample of the current luma block relative to the top left sample of the current picture,
- two variables nCbW and nCbH specifying the width and the height of the current luma coding block,
- an array recSamples specifying the reconstructed luma samples of the current block.

The output array of padded reconstructed luma samples of the current block recSamplesPad[ x ][ y ] with x = −1..nCbW, y = −1..nCbH are derrived as follows:

When 0 <= x <= nCbW − 1 and 0 <= y <= nCbH − 1, the following applies:
   recSamplesPad[ x ][ y ] = recSamples[ x ][ y ]

- Otherwise, the following applies:
  - The derivation process for neighbouring block availability as specified in clause 6.4.1 is invoked with the current luma location ( xCurr, yCurr ) set equal to ( xCb, yCb ) and the neighbouring luma location ( xNbY, yNbY ) set equal to ( xCb + x, yCb + y ) as inputs, and the output is assigned to availableN.
  - the variable dx is set to 0 and variable dy is set to 0,
  - when x = = −1 and availableN is equal to FALSE, or constraint_intra_pred_flag is equal to 1 and CuPredMode[ xCb + x ][ yCb + y ] is not equal to MODE_INTRA, dx = 1,  ⎫⎬⎭ 2510
  - when x = = nCbW and availableN is equal to FALSE, or constraint_intra_pred_flag is equal to 1 and CuPredMode[ xCb + x ][ yCb + y ] is not equal to MODE_INTRA, dx = −1,  ⎫⎬⎭ 2520
  - when y = = −1 and availableN is equal to FALSE, or constraint_intra_pred_flag is equal to 1 and CuPredMode[ xCb + x ][ yCb + y ] is not equal to MODE_INTRA, dy = 1,  ⎫⎬⎭ 2530
  - when y = = nCbH and availableN is equal to FALSE, or constraint_intra_pred_flag is equal to 1 and CuPredMode[ xCb + x ][ yCb + y ] is not equal to MODE_INTRA, dy = −1,  ⎫⎬⎭ 2540
       recSamplesPad[ x ][ y ] = recSamples[ x + dx ][ y + dy ]

FIG. 26

```
                    2610
                   /
if ( normal mode ) {
    intra_mpm_flag;              ⎫
    if(intra_mpm_flag) {        ⎪
        intra_mpm_idx;          ⎬ 2620
    }                           ⎪
    else {                      ⎪
        intra_remainder;        ⎭
    }
2630 — else {
        ...              ⟋ 2640
        current mode coding process – MRL, ISP, IBC, ···, etc. ;
        ...
    }
```

FIG. 27

```
                              ┌2710
        if ( normal mode ) {
            intra_mpm_flag;        ┐
            if(intra_mpm_flag) {   │
                intra_mpm_idx;     ├ 2720
            }                      │
            else {                 │
                intra_remainder;   ┘
            }
2730 ──── else {
            ...
            tool on/off combination index – MRL, ISP, IBC, ···, etc. ;   ┌2740
            ...
            intra_mpm_flag;
            if(intra_mpm_flag) {
                intra_mpm_idx;
            }
            else {
                intra_remainder;
            }
        }
```

FIG. 28

| INTRA MODE | EXISTING BLOCK SIZE RESTRICTION |
|---|---|
| Intra subpartition prediction (ISP) | W <= 64 && H <= 64 |
| Matrix based intra prediction (MIP) | W <= 64 && H <= 64 |
| Multiple reference line prediction (MRL) | – |
| Intra block copy (IBC) | W < 128 \|\| H < 128 |
| Normal Intra prediction in Dual tree | W <= 64 && H <= 64 |
| Normal Intra prediction in Single tree | – |
| Intra RDPCM | W <= 32 && H <=32 |

FIG. 29

```
if (width <=64 && height <= 64) {
    ISP, MIP, MRL, IBC, ⋯ , etc. on/off
}
else {
            normal intra prediction
}
```

FIG. 30

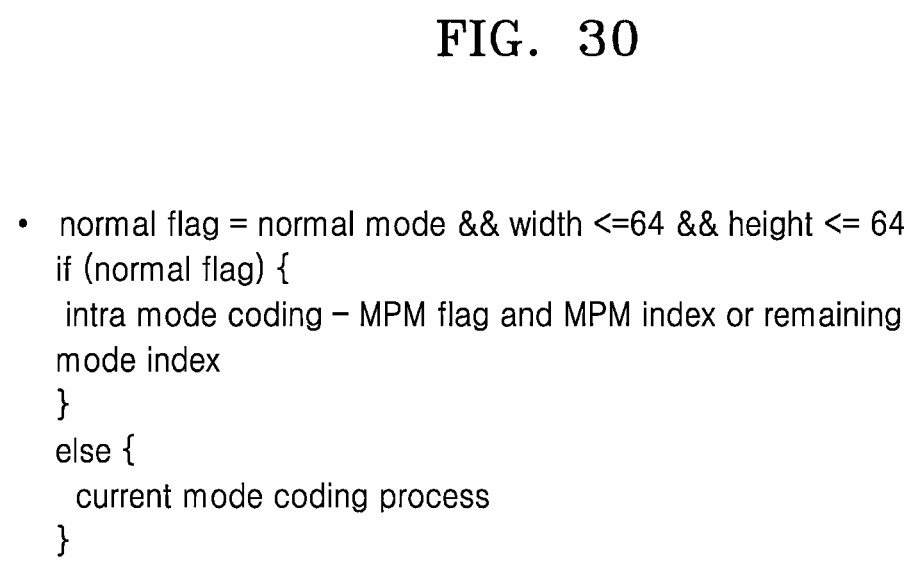

- normal flag = normal mode && width <=64 && height <= 64
  if (normal flag) {
  intra mode coding – MPM flag and MPM index or remaining
  mode index
  }
  else {
    current mode coding process
  }

FIG. 31

```
isIntra = (is intra coded block?) && (width <=64 && height <= 64)
 if (isIntra) {
     ISP, MIP, MRLP, IBC, Dual tree, ··· , etc. on/off
     if(width <=32 && height <= 32) {
         intra RDPCM on/off
     }
 }
 else {
     Inter prediction
 }
```

1

VIDEO ENCODING METHOD AND DEVICE FOR PERFORMING POST-RECONSTRUCTION FILTERING IN CONSTRAINED PREDICTION MODE, AND VIDEO DECODING METHOD AND DEVICE

CROSS-REFERENCE TO RELATED APPLICATIONS

This application is a Continuation of U.S. application Ser. No. 17/551,483, filed on Dec. 15, 2021 which is a bypass continuation application of International Application No. PCT/KR2020/008080, filed on Jun. 22, 2020, which is based on and claims benefit of U.S. Provisional Application No. 62/864,816 filed on Jun. 21, 2019, and U.S. Provisional Application No. 62/971,485 filed on Feb. 7, 2020, the disclosures of which are incorporated by reference herein in their entireties.

BACKGROUND

1. Field

The disclosure relates to methods and apparatuses for encoding and decoding an image. More particularly, the disclosure relates to methods and apparatuses for encoding and decoding videos by splitting an image into blocks of various shapes.

2. Description of the Related Art

In a related art compression method, square coding units are determined through recursive splitting processes in which it is determined whether to split a coding unit included in a picture while determining a size of the coding unit and then the coding unit is uniformly split into four coding units of the same size. However, recently, image quality deterioration of a reconstructed image caused by the use of coding units having the uniform shape of a square for a high-resolution image has become a problem. Accordingly, methods and apparatuses for splitting a high-resolution image into coding units of various shapes have been proposed.

SUMMARY

The disclosure provides an encoding method, an encoding apparatus, a decoding method and a decoding apparatus for effectively signaling syntax elements regarding sizes of coding units of various shapes.

According to an aspect of the disclosure, provided are a video encoding method and apparatus, or a video decoding method and apparatus, which determine a padding value corresponding to neighboring samples such that post-reconstruction filtering may be performed on a current block, when accessibility to a neighboring block is restricted or when in a constrained intra prediction mode.

According to an aspect of the disclosure, there is provided a video decoding method including: obtaining information indicating whether a constrained intra prediction mode is used or not, when the constrained intra prediction mode is used for a current block, generating predicted samples of the current block using samples in a neighboring block decoded using intra prediction mode without using samples a neighboring block decoded using inter prediction mode, generating reconstructed samples of the current block by using the prediction samples of the current block and residual samples of the current block, when the constrained intra prediction mode is used for the current block and a prediction mode of a neighboring block is not an intra prediction mode, determining a padding value for a position in the neighboring block adjacent to the current block, by using at least one of the reconstructed samples of the current block; and performing post-reconstruction filtering on the reconstructed samples of the current block by using the padding value.

The generating of the reconstructed samples of the current block may include: generating the residual samples of the current block by performing inverse transformation on the current block.

The determining of the padding value for the position in the neighboring block adjacent to the current block may include determining the padding value for the position in the neighboring block adjacent to a boundary between the current block and the neighboring block to be same as a reconstructed sample value of the current block adjacent to the boundary.

The video decoding method may include, based on a sample of the neighboring block adjacent to the current block being not available for prediction of the current block, determining the padding value for the position in the neighboring block adjacent to a boundary between the current block and the neighboring block to be same as a reconstructed sample value of the current block adjacent to the boundary.

The performing of the post-reconstruction filtering on reconstructed samples of the current block may include performing 2×2 Hadamard transform domain filtering based on two reconstructed samples of the current block adjacent to a boundary between the current block and the neighboring block and padding values for two positions adjacent to the boundary.

The performing of the post-reconstruction filtering on the reconstructed samples of the current block may include performing bilateral filtering based on the reconstructed samples of the current block adjacent to the boundary between the current block and the neighboring block and the padding value for the position adjacent to the boundary.

The video decoding method may include performing prediction on a first block adjacent to the current block, in an intra mode, based on the reconstructed samples of the current block, which are updated via the post-reconstruction filtering; and performing in-loop filtering on the reconstructed samples of the current block, which are updated via the post-reconstruction filtering.

According to another aspect of the disclosure, there is provided a video decoding apparatus includes: an obtainer configured to execute the instructions to: obtain information indicating whether a constrained intra prediction mode is used or not; a reconstructor configured to, when the constrained intra prediction mode is used for a current block, generate predicted samples of the current block using samples in a neighboring block decoded using intra prediction mode without using samples a neighboring block decoded using inter prediction mode, and generate reconstructed samples of the current block based on the prediction samples of the current block and residual samples of the current block; and a post-reconstruction filter configured to, when the constrained intra prediction mode is used for the current block and a prediction mode of a neighboring block is not an intra prediction mode, determine a padding value for a position in the neighboring block adjacent to the current block, by using at least one of the reconstructed samples of the current block, and perform post-reconstruction filtering on the reconstructed samples of the current block by using the padding value.

According to another aspect of the disclosure, there is provided a video encoding method including: generating constrained prediction information indicating whether a constrained intra prediction mode is used or not; when the constrained intra prediction mode is used for a current block, generating predicted samples of the current block using samples in a neighboring block decoded using intra prediction mode without using samples a neighboring block decoded using inter prediction mode; generating reconstructed samples of the current block by using the prediction samples of the current block and residual samples of the current block; when the constrained intra prediction mode is used for the current block and a prediction mode of a neighboring block is not an intra prediction mode, determining a padding value for a position in a neighboring block adjacent to the current block, by using the reconstructed samples of the current block; and performing post-reconstruction filtering on the current block, by using at least one of the padding value corresponding to the neighboring sample.

The generating of the reconstructed samples of the current block may include: generating the residual samples of the current block by performing inverse transformation on the current block.

The determining of the padding value for the position in neighboring block adjacent to the current block comprises determining the padding value for the position in the neighboring block adjacent to a boundary between the current block and the neighboring block to be the same as a reconstructed sample value of the current block adjacent to the boundary.

The video encoding method may include, when a sample of the neighboring block adjacent to the current block is not available for prediction of the current block, determining the padding value for the position in the neighboring block adjacent to a boundary between the current block and the neighboring block to be the same as a reconstructed sample value of the current block adjacent to the boundary.

The performing of the post-reconstruction filtering on the reconstructed samples of the current block by using the padding value comprises performing 2×2 Hadamard transform domain filtering by using two reconstructed samples of the current block adjacent to a boundary between the current block and the neighboring block and padding values corresponding to two neighboring samples adjacent to the boundary.

The performing of the post-reconstruction filtering on the reconstructed samples of the current block by using the padding value comprises performing bilateral filtering by using the reconstructed samples of the current block adjacent to the boundary between the current block and the neighboring block and the padding value for the position adjacent to the boundary.

The video encoding method may include performing prediction on a first block adjacent to the current block, in an intra mode, based on the reconstructed samples of the current block, which are updated via the post-reconstruction filtering; and performing in-loop filtering on the reconstructed samples of the current block, which are updated via the post-reconstruction filtering.

According to various embodiments of the disclosure, post-reconstruction filtering can be performed on a current block by using a sample value of the current block instead of a sample value of a neighboring block, when there is no availability of the neighboring block or when the neighboring block is not reconstructed in an intra prediction mode, in a constrained prediction mode. Accordingly, the post-reconstruction filtering may be fundamentally prevented from being performed on the current block by using information about neighboring blocks of which reliability of an adjacent reconstruction sample is not high due to an unsatisfactory coding environment.

However, effects achievable by video encoding and decoding methods and video encoding and decoding apparatuses, according to an embodiment, are not limited to those mentioned above, and other effects that are not mentioned could be clearly understood by one of ordinary skill in the art from the following description.

BRIEF DESCRIPTION OF DRAWINGS

A brief description of each drawing is provided to better understand the drawings cited herein.

FIG. 4 illustrates a process, performed by an image decoding apparatus, of determining at least one coding unit by splitting a non-square coding unit, according to an example embodiment.

FIG. 6 illustrates a method, performed by an image decoding apparatus, of determining a certain coding unit from among an odd number of coding units, according to an example embodiment.

FIG. 10 illustrates that a shape into which a second coding unit is splittable is restricted when the second coding unit having a non-square shape, which is determined when an image decoding apparatus splits a first coding unit, satisfies a certain condition, according to an example embodiment.

FIG. 11 illustrates a process, performed by an image decoding apparatus, of splitting a square coding unit when split shape mode information is unable to indicate that the square coding unit is split into four square coding units, according to an example embodiment.

FIG. 13 illustrates a process of determining a depth of a coding unit as a shape and size of the coding unit change, when the coding unit is recursively split such that a plurality of coding units are determined, according to an example embodiment.

Figure 14:
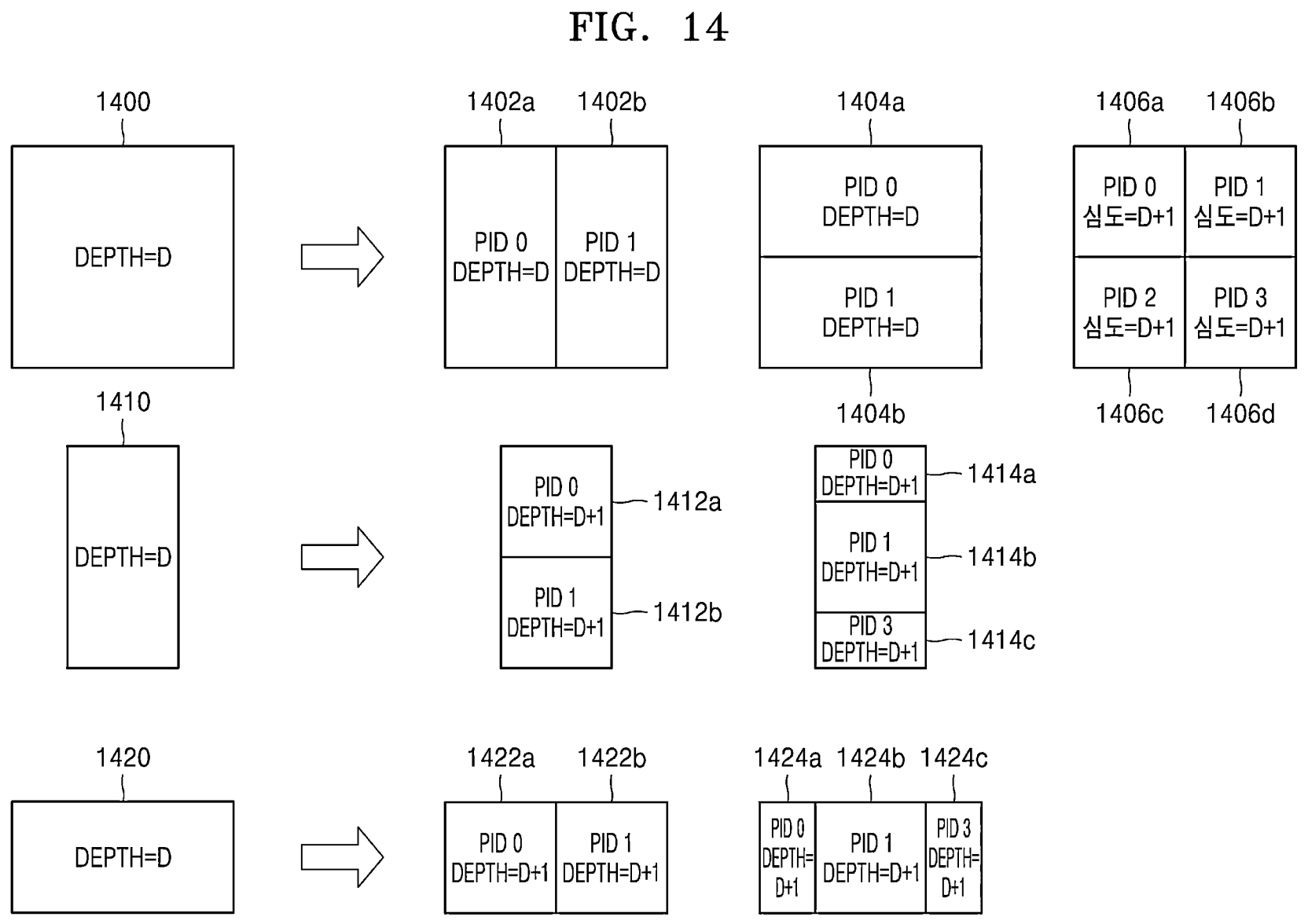

FIG. 14 illustrates depths that are determinable based on shapes and sizes of coding units, and part indexes (PIDs) that are for distinguishing the coding units, according to an example embodiment.

Figure 15:
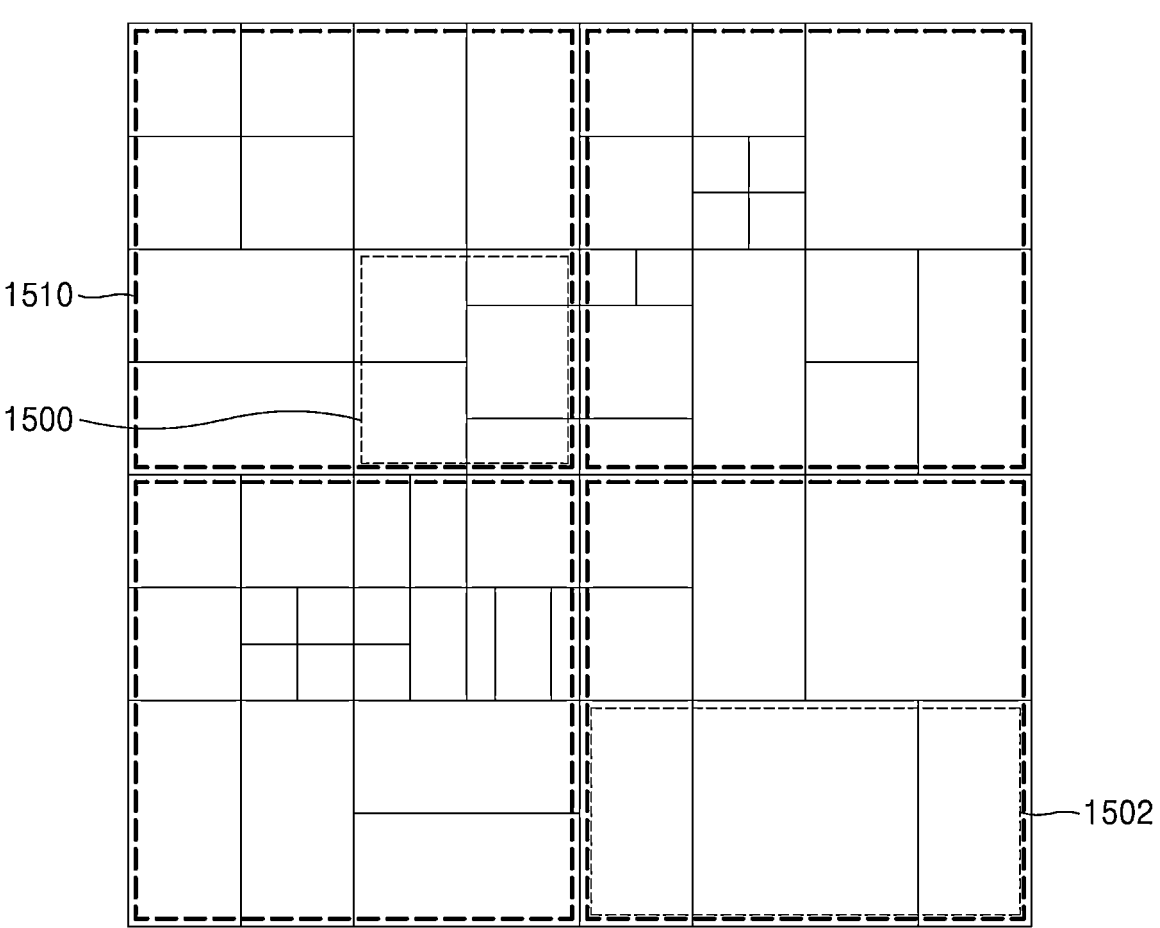

FIG. 15 illustrates that a plurality of coding units are determined based on a plurality of certain data units included in a picture, according to an example embodiment.

Figure 16:
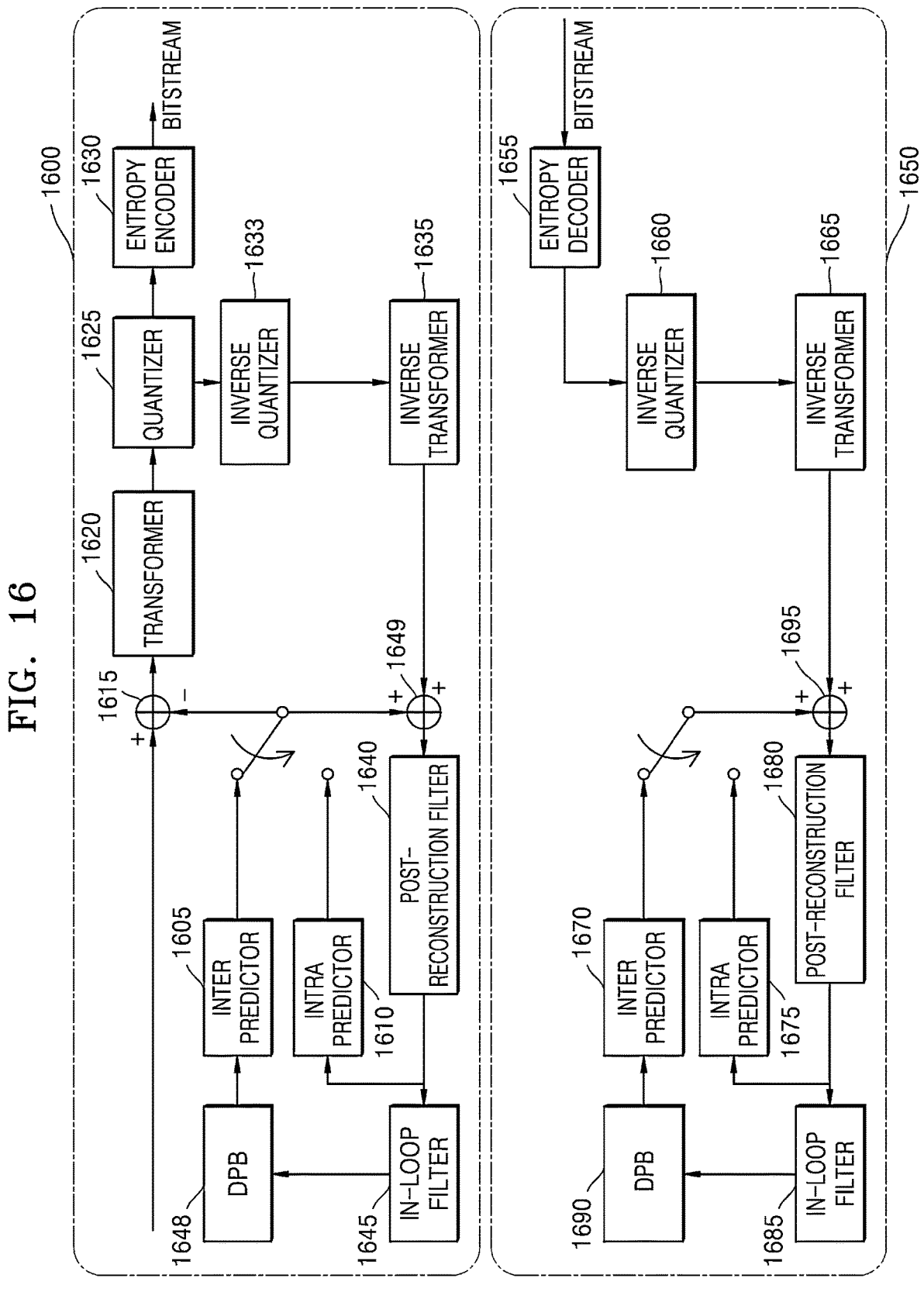

FIG. 16 is a block diagram of an image encoding and decoding system.

Figure 17:
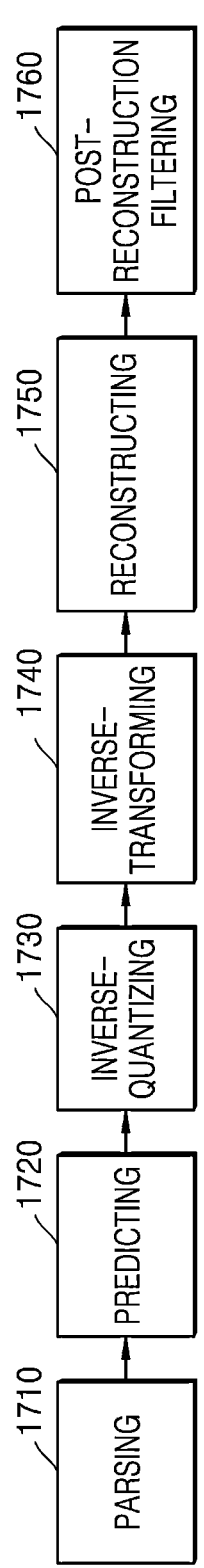

FIG. 17 illustrates an image decoding process including post-reconstruction filtering.

Figure 18:
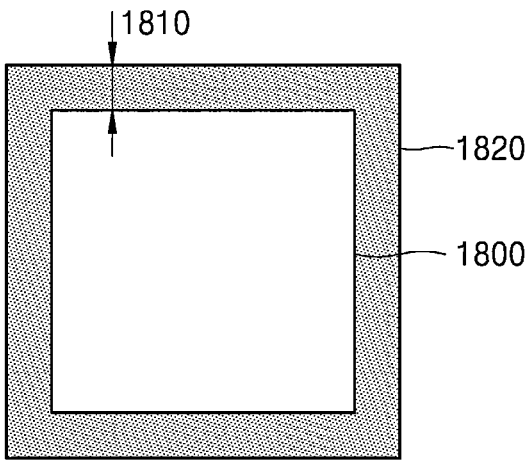

FIG. 18 illustrates a reference region for post-reconstruction filtering.

Figure 19:
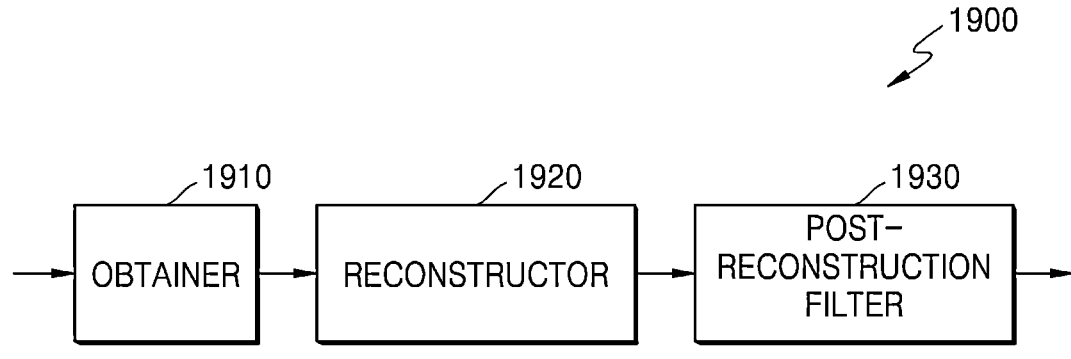

FIG. 19 is a block diagram of a video decoding apparatus according to an example embodiment.

FIG. 20 is a flowchart of a video decoding method according to an example embodiment.

Figure 21:
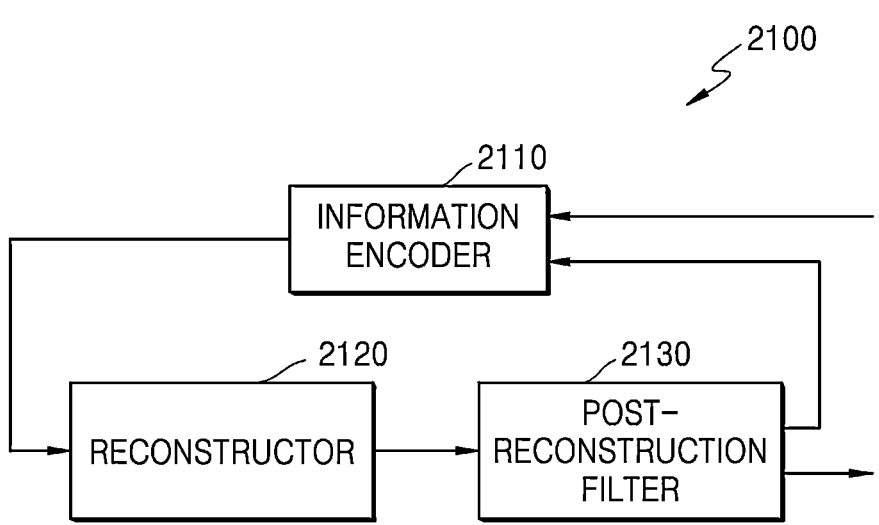

FIG. 21 is a block diagram of a video encoding apparatus according to an example embodiment.

Figure 22:
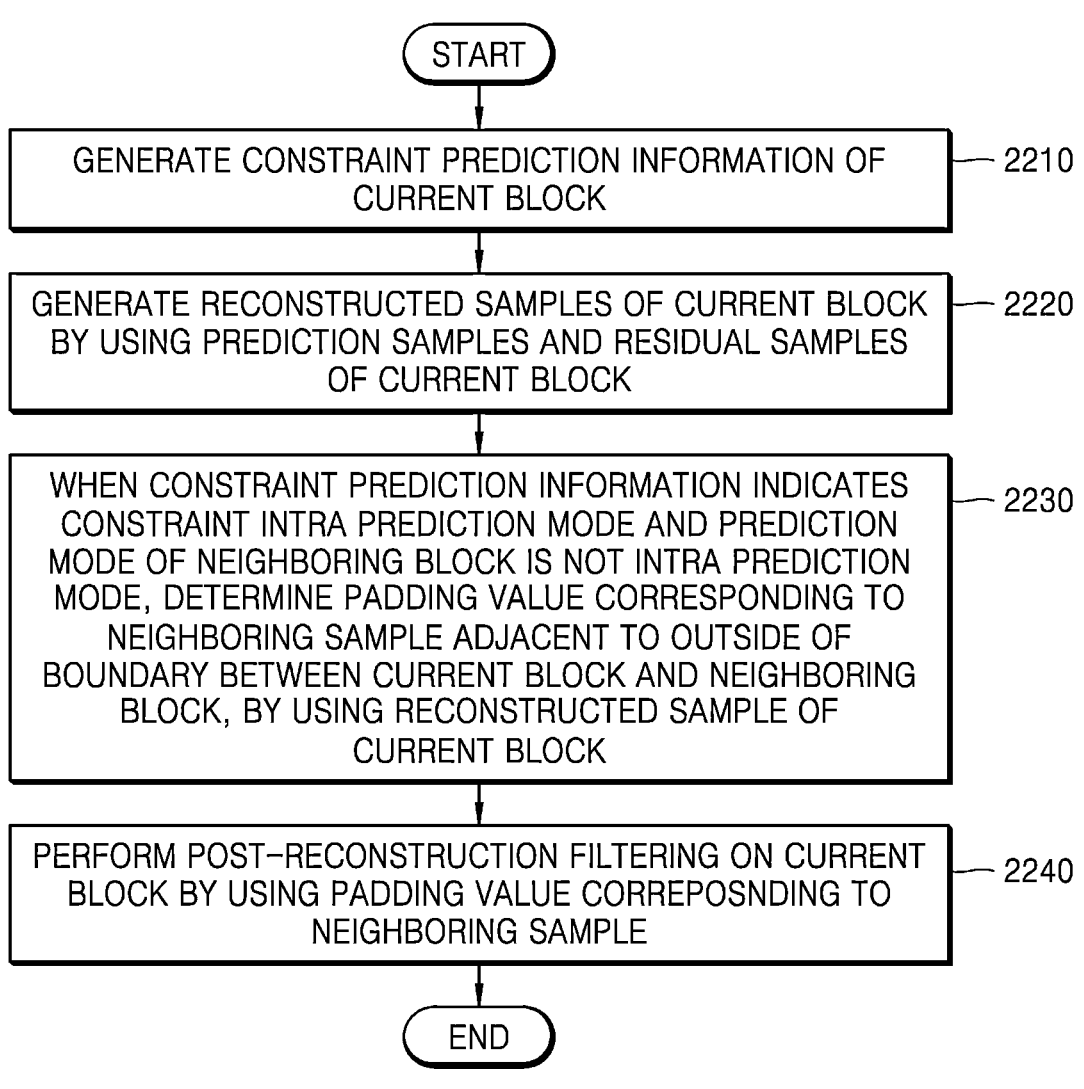

FIG. 22 is a flowchart of a video encoding method according to an example embodiment.

FIG. 23 illustrates a process of verifying availability of a neighboring sample adjacent to a current block, according to an example embodiment.

FIG. 24 illustrates a process of determining a padding value corresponding to a neighboring sample for post-reconstruction filtering with respect to a current block, based on availability of the neighboring sample, according to an example embodiment.

FIG. 25 illustrates a process of determining a padding value corresponding to a neighboring sample for post-reconstruction filtering with respect to a current block, based on availability of the neighboring sample and a constrained prediction mode, according to an example embodiment.

FIG. 26 illustrates pseudo-code for defining intra prediction when a flag indicating a case of a normal intra prediction mode is present, according to an example embodiment.

FIG. 27 illustrates pseudo-code for defining intra prediction when an index for indicating an on/off state of remaining intra prediction modes other than a normal intra prediction mode is present, according to another example embodiment.

FIG. 28 illustrates block sizes allowed to perform intra prediction, for each of various intra prediction modes.

FIG. 29 illustrates pseudo-code for restricting a block size at once, before an intra prediction mode is determined, according to an example embodiment.

FIG. 30 illustrates pseudo-code for restricting a block intra size together with a normal intra prediction mode flag, according to another example embodiment.

FIG. 31 illustrates pseudo-code for restricting intra prediction to be performed only for a specific block size or less, according to another example embodiment.

DETAILED DESCRIPTION

In the following disclosure, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the present disclosure. Also, numbers (for example, a first, a second, and the like) used in the description of the specification are merely identifier codes for distinguishing one element from another.

Also, in the disclosure, it will be understood that when elements are "connected" or "coupled" to each other, the elements may be directly connected or coupled to each other, but may alternatively be connected or coupled to each other with an intervening element therebetween, unless specified otherwise.

In the disclosure, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component. In the disclosure, a 'module' or a 'unit' performs at least one function or operation and may be implemented by hardware or software or a combination of the hardware and the software. In addition, a plurality of 'modules' or 'units' may be integrated into at least one module and may be realized as at least one processor in an integrated manner except for 'modules' or 'units' that should be realized in specific hardware.

Also, in the disclosure, an 'image' or a 'picture' may denote a still image of a video or a moving image, i.e., the video itself.

Also, in the disclosure, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the disclosure, a 'current block' may denote a block of a largest coding unit, coding unit, prediction unit, or transform unit of a current image to be encoded or decoded.

In the disclosure, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a unidirection may denote a motion vector used to indicate a block in a reference picture included in a list 0 or list 1, and a motion vector in a bidirection may denote that the motion vector includes a motion vector in a list 0 direction and a motion vector in a list 1 direction.

Also, in the disclosure, a 'binary split' of a block denotes a split for generating two subblocks of which a width or height is half the width or height of the block. In detail, when a 'binary vertical split' is performed on a current block, a split is performed in a vertical direction (longitudinal direction) at half the width of the current block, and thus two subblocks having a width that is half the width of the current block and the same height as the current block may be generated. When a 'binary horizontal split' is performed on the current block, a split is performed in a horizontal direction (traverse direction) at half the height of the current block, and thus two subblocks having a height that is half the height of the current block and the same width as the current block may be generated.

Also, in the disclosure, a 'ternary split' of a block denotes a split for generating three subblocks of which the widths or heights are 1:2:1 of those of the block. In detail, when a 'ternary vertical split' is performed on a current block, a split is performed in a vertical direction (longitudinal direction) at points of 1:2:1 of the width of the current block, and thus two subblocks having a width that is ¼ the width of the current block and the same height as the current block, and one subblock having a width that is ½ the width of the current block and the same height as the current block may be generated. When a 'ternary horizontal split' is performed on the current block, a split is performed in a horizontal direction (traverse direction) at points of 1:2:1 of the height of the current block, and thus two subblocks having a height that is ¼ the height of the current block and the same width as the current block, and one subblock having a height that is ½ the height of the current block and the same width as the current block may be generated.

Also, in the disclosure, a 'quad split' of a block denotes a split for generating four subblocks of which the widths and heights are 1:1 of those of the block. In detail, when the 'quad split' is performed on a current block, a split is performed in a vertical direction (longitudinal direction) at half the width of the current block and a split is performed in a horizontal direction (traverse direction) at half the height of the current block, and thus four subblocks having a width that is ½ the width of the current block and a height that is ½ the height of the current block may be generated.

Hereinafter, an image encoding apparatus and an image decoding apparatus, and an image encoding method and an image decoding method according to example embodiments will be described with reference to FIGS. 1 through 16. A method of determining a data unit of an image, according to an example embodiment, will be described with reference to FIGS. 3 through 15, and a video encoding/decoding method according to an example embodiment, will be described with reference to FIGS. 16 through 31.

Hereinafter, a method and apparatus for adaptive selection based on various shapes of coding units, according to an example embodiment of the disclosure, will be described with reference to FIGS. 1 and 2.

Figure 1:
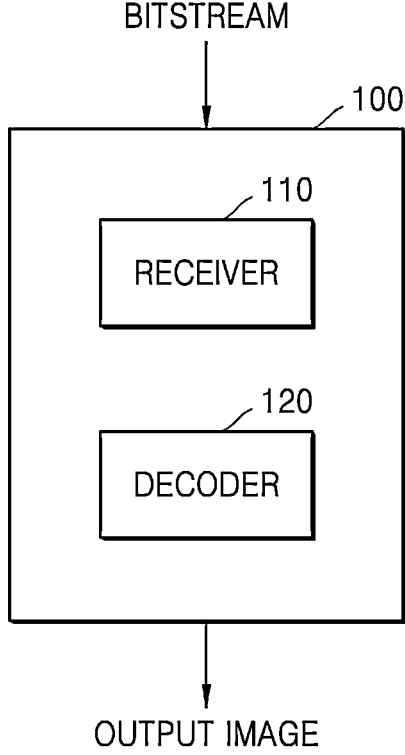
FIG. 1 is a schematic block diagram of an image decoding apparatus according to an example embodiment.

FIG. 1 is a schematic block diagram of an image decoding apparatus according to an example embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor. According to an example embodiment, the at least one processor may be a central processing unit (CPU) or other hardware processors. According to an example embodiment, the memory may be a volatile memory or a non-volatile memory.

The receiver 110 may receive a bitstream. The bitstream includes information of an image encoded by encoding device 1600 described later. Also, the bitstream may be transmitted from the encoding device 1600. The encoding device 1600 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
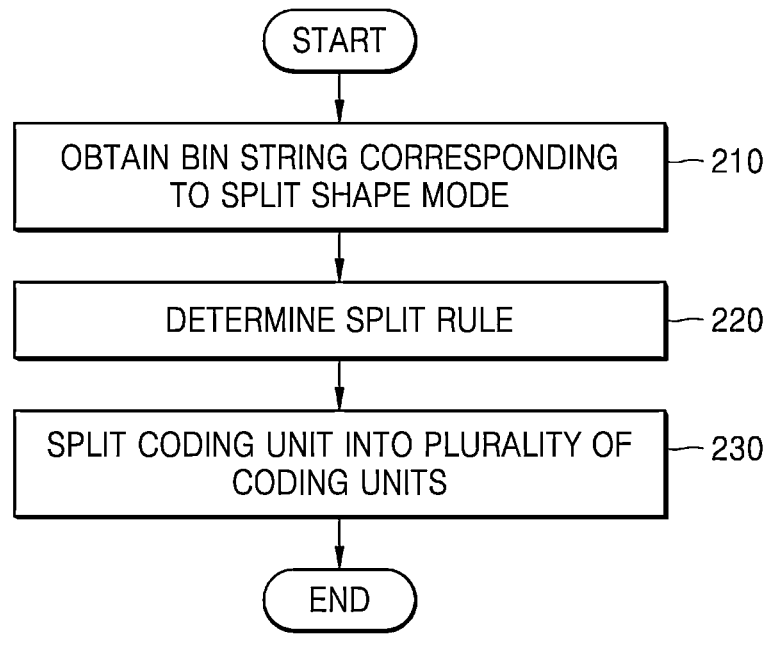
FIG. 2 is a flowchart of an image decoding method according to an example embodiment.

FIG. 2 is a flowchart of an image decoding method according to an example embodiment.

According to an example embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode or the split rule (operation 230). The image decoding apparatus 100 may determine an allowable first range of a size of the coding unit, according to a height to width ratio of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an example embodiment of the present disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTU) denotes an N×N block including N×N samples (N is an integer). Each color component may be split into one or more largest coding blocks.

When a picture includes three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. The luma sample corresponds to the brightness in the image and the chroma samples corresponding to the color information in the image. When a picture is a monochrome picture, a largest coding unit includes a largest coding block of monochrome samples and syntax structures used to encode the monochrome samples. When a picture is a picture encoded in color planes separated according to color components, a largest coding unit includes the picture and syntax structures used to encode samples of the picture.

According to an example embodiment, one largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of monochrome samples and syntax structures used to encode the monochrome samples. When a picture is a picture encoded in color planes separated according to color components, a coding unit includes the picture and syntax structures used to encode samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the disclosure is not limited thereto.

For example, information about a largest size of a luma coding block may be obtained from a bitstream. For example, the largest size of the luma coding block indicated by the information about the largest size of the luma coding block may be one of 4×4, 8×8, 16×16, 32×32, 64×64, 128×128, and 256×256.

For example, information about a luma block size difference and a largest size of a luma coding block that may be split into two may be obtained from a bitstream. The information about the luma block size difference may refer to a size difference between a luma largest coding unit and a largest luma coding block that may be split into two. Accordingly, when the information about the largest size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an example embodiment, because information about a largest size of a luma coding block that is binary splittable is obtained from a bitstream, the largest size of the luma coding block that is binary splittable may be variably determined. In contrast, a largest size of a luma coding block that is ternary splittable may be fixed. For example, the largest size of the luma coding block that is ternary splittable in an I-picture may be 32×32, and the largest size of the luma coding block that is ternary splittable in a P-picture or a B-picture may be 64×64.

Also, a largest coding unit may be hierarchically split into coding units based on split shape mode information obtained from a bitstream. At least one of information indicating whether to perform quad splitting, information indicating whether to perform multi-splitting, split direction information, or split type information may be obtained as the split shape mode information from the bitstream.

For example, the information indicating whether to perform quad splitting may indicate whether a current coding unit is to be quad split (QUAD_SPLIT) or not.

When the current coding unit is not quad split, the information indicating whether to perform multi-splitting may indicate whether the current coding unit is to be no longer split (NO_SPLIT) or to be binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the bin string of the split shape mode information. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether or not to split a coding unit, whether to quad-split a coding unit, a split direction, and a split type, based on one bin string.

The coding unit may be smaller than or same as the largest coding unit. For example, because a largest coding unit is a coding unit having a largest size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another example embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of lower left, left, upper left, top, upper right, right, lower right of the current block.

Figure 3:
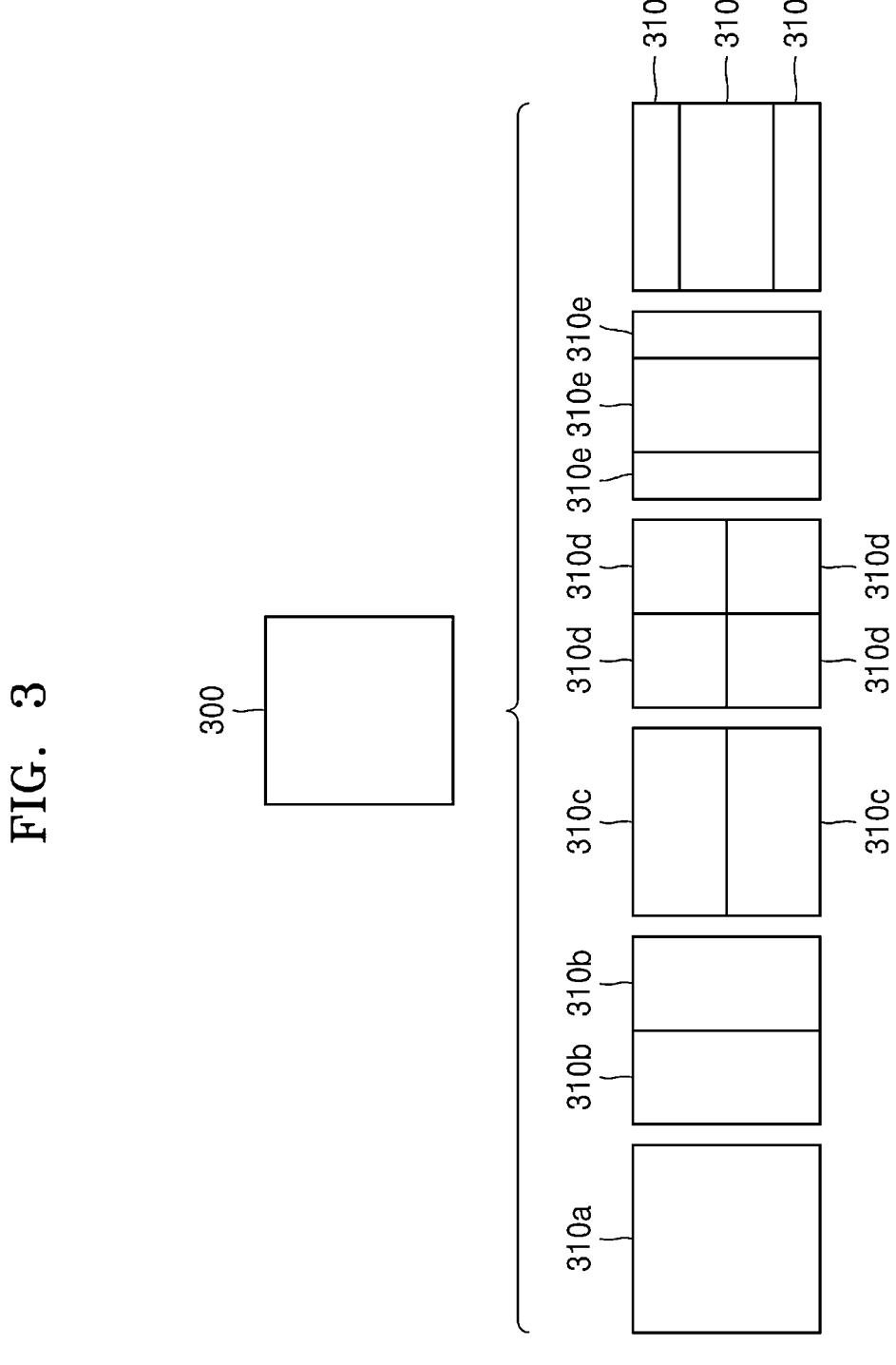
FIG. 3 illustrates a process, performed by an image decoding apparatus, of determining at least one coding unit by splitting a current coding unit, according to an example embodiment.

FIG. 3 illustrates a process, performed by an image decoding apparatus, of determining at least one coding unit by splitting a current coding unit, according to an example embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a height to width ratio, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the height to width ratio among the block shape information of the coding unit to be at least one of 1:2, 2:1, 1:4, 4:1, 1:8, 8:1, 1:16, 16:1, 1:32, or 32:1. Also, the image decoding apparatus 100 may determine whether the coding unit is in a horizontal direction or a vertical direction, based on a magnitude of the width and a magnitude of the height of the coding unit. Also, the image decoding apparatus 100 may determine the size of the coding unit, based on at least one of the length of the width, the length of the height, or the area of the coding unit.

According to an example embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an example embodiment is not limited thereto, and the image decoding apparatus 100 and the encoding device 1600 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "no split". In particular, the image decoding apparatus 100 may determine the size of the largest coding unit to be 256×256. The image decoding apparatus 100 may determine the split shape mode information to be a quad split. According to an example embodiment, the split shape mode information may be predetermined and previously agreed upon. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "no split" with respect to the smallest coding unit.

According to an example embodiment, the image decoding apparatus 100 may use the block shape information indicating that the current coding unit has a square shape. For example, the image decoding apparatus 100 may determine whether or not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating no split, or the decoder 120 may determine coding units 310b, 310c, 310d, 310e, or 310f split based on the split shape mode information indicating a certain splitting method.

Referring to FIG. 3, according to an example embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an example embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various example embodiments.

FIG. 4 illustrates a process, performed by an image decoding apparatus, of determining at least one coding unit by splitting a non-square coding unit, according to an example embodiment.

According to an example embodiment, the image decoding apparatus 100 may use block shape information indicating that a current coding unit has a non-square shape. The image decoding apparatus 100 may determine whether to split the non-square current coding unit by using a certain splitting method or not to split the non-square current coding unit, based on split shape mode information. Referring to FIG. 4, when the block shape information of a current coding unit 400 or 450 indicates a non-square shape, the image decoding apparatus 100 may determine that a coding unit 410 having the same size as the current coding unit 400 or a coding unit 460 having the same size as the current coding unit 450 is not split, based on the split shape mode information indicating no split, or determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various example embodiments.

According to an example embodiment, the image decoding apparatus 100 may determine a splitting method of a coding unit by using the split shape mode information. According to an example embodiment, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b corresponding to the coding unit 400, or 470a and 470b corresponding to coding unit 450, by splitting the current coding unit 400 or 450 based on the split shape mode information.

According to an example embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an example embodiment, when the split shape mode information indicates to split a coding unit into an odd number of blocks, the image decoding apparatus 100 may determine an odd number of coding units included in the current coding unit 400 or 450. For example, when the split shape mode information indicates to split the current coding unit 400 or 450 into three coding units (ternary-split), the image decoding apparatus 100 may split the current coding unit 400 into three coding units 430a, 430b, and 430c, or the current coding unit 500 into three coding units 480a, 480b, and 480c.

According to an example embodiment, a height to width ratio of the current coding unit 400 or 450 may be 4:1 or 1:4. When the height to width ratio is 4:1, the block shape information may be a horizontal direction because the magnitude of the width is longer than the magnitude of the height. When the height to width ratio is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an example embodiment, the image decoding apparatus 100 may determine the odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an example embodiment, when the split shape mode information indicates to split a coding unit into the odd number of blocks, the image decoding apparatus 100 may determine the odd number of coding units included in the current coding unit 400 or 450. In addition, the image decoding apparatus 100 may put a certain restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c or 480a, 480b, and 480c generated as the current coding unit 400 or 450 is split to be different from that of the other coding units 430a and 430c, or 480a or 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
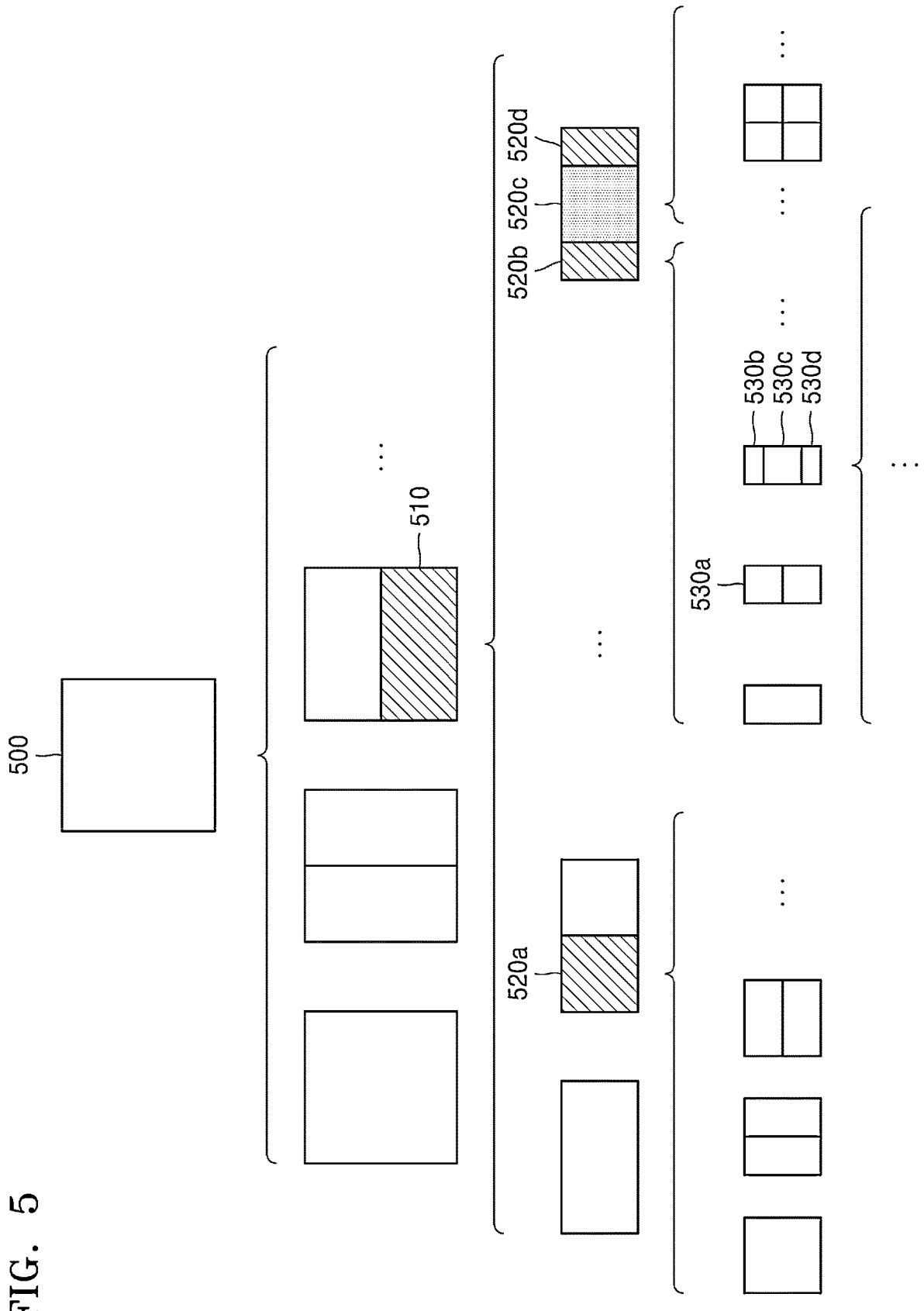
FIG. 5 illustrates a process, performed by an image decoding apparatus, of splitting a coding unit based on at least one of block shape information or split shape mode information, according to an example embodiment.

FIG. 5 illustrates a process, performed by an image decoding apparatus, of splitting a coding unit based on at least one of block shape information or split shape mode information, according to an example embodiment.

According to an example embodiment, the image decoding apparatus 100 may determine to split or not to split a square first coding unit 500 into coding units, based on at least one of the block shape information or the split shape mode information. According to an example embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an example embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an example embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may obtain a plurality of various-shaped second coding units (e.g., the second coding unit 510) by splitting the first coding unit 500, based on the obtained split shape mode information, and the second coding unit 510 may be split by using a splitting method of the first coding unit 500 based on the split shape mode information. According to an example embodiment, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520*b*, 520*c*, and 520*d* determined by splitting the non-square second coding unit 510 (e.g., a coding unit at a center location or a square coding unit) may be recursively split. According to an example embodiment, the square third coding unit 520*b* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to various example embodiments.

According to an example embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an example embodiment, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an example embodiment, the image decoding apparatus 100 may obtain the split shape mode information, which is used to split a current coding unit, from a certain location in the current coding unit.

FIG. 6 illustrates a method, performed by an image decoding apparatus, of determining a certain coding unit from among an odd number of coding units, according to an example embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an example embodiment, when the current coding unit is split into a certain number of coding units, the image decoding apparatus 100 may select one of the coding units. Various methods may be used to select one of a plurality of coding units, as will be described below in relation to various example embodiments.

According to an example embodiment, the image decoding apparatus 100 may split the current coding unit into a plurality of coding units, and may determine a coding unit at a certain location.

According to an example embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an example embodiment, the information indicating the locations of the upper left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an example embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an example embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a certain location by using coordinates of a sample included in the coding unit, as information indicating a location of the sample, is not limited to the above-described method, and may include various arithmetic methods capable of using the coordinates of the sample.

According to an example embodiment, the image decoding apparatus 100 may split the current coding unit 600 into a plurality of coding units 620a, 620b, and 620c, and may select one of the coding units 620a, 620b, and 620c based on a certain criterion. For example, the image decoding apparatus 100 may select the coding unit 620b, which has a size different from that of the others, from among the coding units 620a, 620b, and 620c.

According to an example embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an example embodiment, the image decoding apparatus 100 may determine the width of the upper coding unit 620a to be the width of the current coding unit 600. The image decoding apparatus 100 may determine the height of the upper coding unit 620a to be yb-ya. According to an example embodiment, the image decoding apparatus 100 may determine the width of the middle coding unit 620b to be the width of the current coding unit 600. The image decoding apparatus 100 may determine the height of the middle coding unit 620b to be yc-yb. According to an example embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an example embodiment, the image decoding apparatus 100 may determine the width of the left coding unit 660a to be xe-xd. The image decoding apparatus 100 may determine the height of the left coding unit 660a to be the height of the current coding unit 650. According to an example embodiment, the image decoding apparatus 100 may determine the width of the middle coding unit 660b to be xf-xe. The image decoding apparatus 100 may determine the height of the middle coding unit 660b to be the height of the current coding unit 600. According to an example embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an example embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units having different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units having different locations in a vertical direction and put a restriction on the coding unit.

According to an example embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an example embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an example embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an example embodiment, the image decoding apparatus 100 may determine the sample 640 at the center location of the current coding unit 600 as the sample from which the certain information may be obtained, and may put a certain restriction on the coding unit 620b including the sample 640, in a decoding operation. According to an example embedment, the image decoding apparatus 100 may determine the sample 690 at the center location of the current coding unit 650 as the sample from which the certain information may be obtained, and may put a certain restriction on the coding unit 670b including the sample 690, in a decoding operation. However, the location of the sample from which the certain information may be obtained is not limited to the above-described location, and may include arbitrary locations of samples included in the coding unit 620b to be determined for a restriction.

According to an example embodiment, the location of the sample from which the certain information may be obtained may be determined based on the shape of the current coding unit 600. According to an example embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width or height of the current coding unit in half, as the sample from which the certain information may be obtained, by using at least one of information about the width of the current coding unit or information about the height of the current coding unit. As another example, when the block shape information of the current coding unit indicates a non-square shape, the image decoding apparatus 100 may determine one of samples including a boundary for splitting a long side of the current coding unit in half, as the sample from which the predetermined information may be obtained.

According to an example embodiment, when the current coding unit is split into a plurality of coding units, the image decoding apparatus 100 may use the split shape mode information to determine a coding unit at a certain location from among the plurality of coding units. According to an example embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an example embodiment, the image decoding apparatus 100 may determine one or more coding units by splitting the current coding unit, and may determine an order of decoding the one or more coding units, based on a certain block (e.g., the current coding unit).

Figure 7:
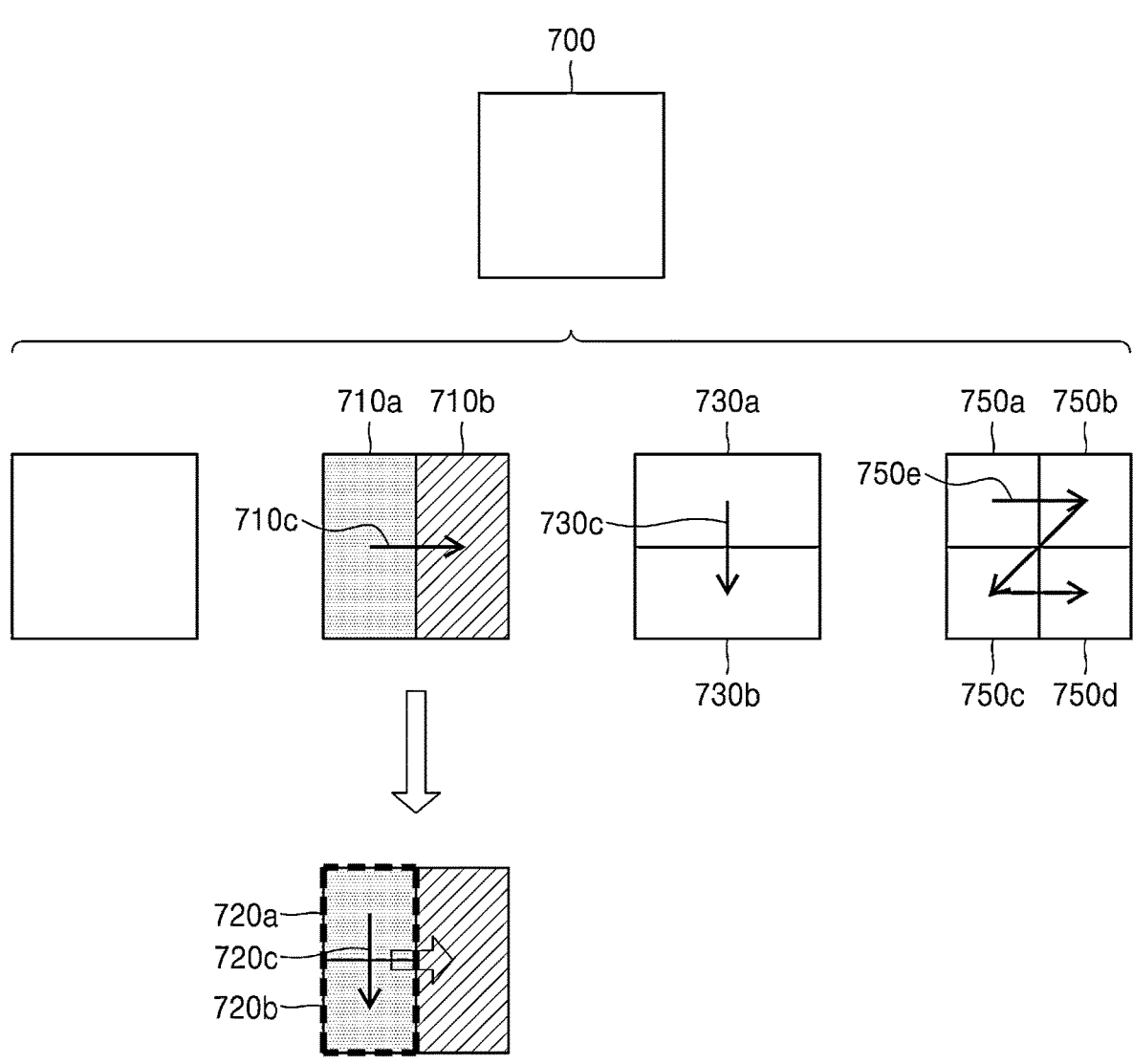
FIG. 7 illustrates an order of processing a plurality of coding units when an image decoding apparatus determines the plurality of coding units by splitting a current coding unit, according to an example embodiment.

FIG. 7 illustrates an order of processing a plurality of coding units when an image decoding apparatus determines the plurality of coding units by splitting a current coding unit, according to an example embodiment.

According to an example embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an example embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710b, 730a and 730b, or 750a to 750d. A splitting method of the plurality of coding units 710b, 730a and 730b, or 750a to 750d may correspond to a splitting method of the first coding unit 700. As such, each of the plurality of coding units 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an example embodiment, the image decoding apparatus 100 may determine third coding units 720a and 720b by splitting the left second coding unit 710a in a horizontal direction, and may not split the right second coding unit 710b.

According to an example embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
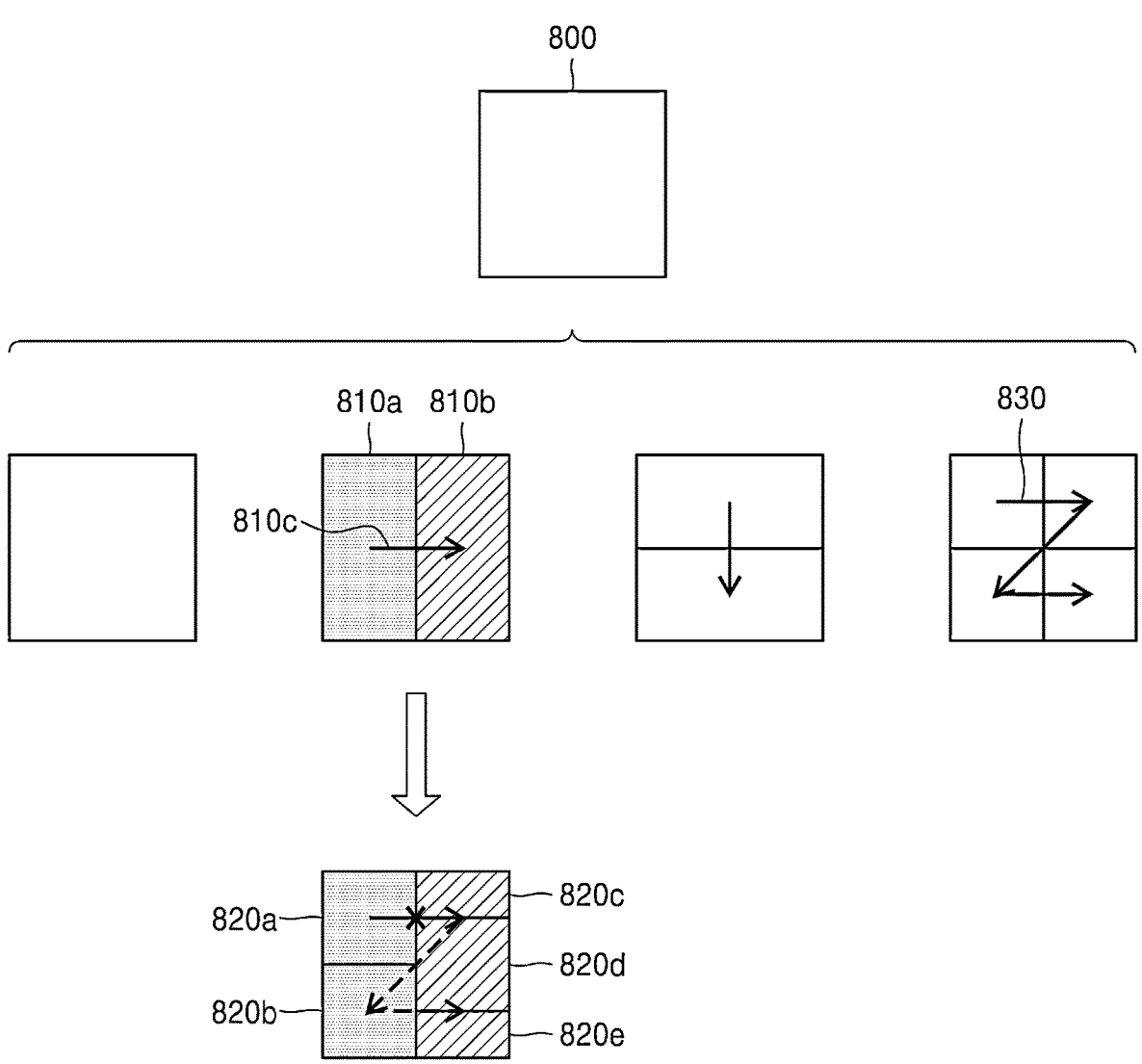
FIG. 8 illustrates a process, performed by an image decoding apparatus, of determining that a current coding unit is to be split into an odd number of coding units, when the coding units are not processable in a certain order, according to an example embodiment.

FIG. 8 illustrates a process, performed by an image decoding apparatus, of determining that a current coding unit is to be split into an odd number of coding units, when the coding units are not processable in a predetermined order, according to an example embodiment.

According to an example embodiment, the image decoding apparatus 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an example embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an example embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information or the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an example embodiment, the image decoding apparatus 100 may determine whether the third coding units 820a and 820b, and 820c to 820e included in the first coding unit 800 satisfy the condition for processing in the certain order, and the condition relates to whether at least one of a width or height of the second coding units 810a and 810*b* is split in half along a boundary of the third coding units 820*a* and 820*b*, and 820*c* to 820*e*. For example, the third coding units 820*a* and 820*b* determined when the height of the left second coding unit 810*a* of the non-square shape is split in half may satisfy the condition. It may be determined that the third coding units 820*c* to 820*e* do not satisfy the condition because the boundaries of the third coding units 820*c* to 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is split into an odd number of coding units, based on a result of the determination. According to an example embodiment, when a coding unit is split into an odd number of coding units, the image decoding apparatus 100 may put a certain restriction on a coding unit at a certain location from among the split coding units. The restriction or the certain location has been described above in relation to various example embodiments, and thus detailed descriptions thereof are not provided again.

Figure 9:
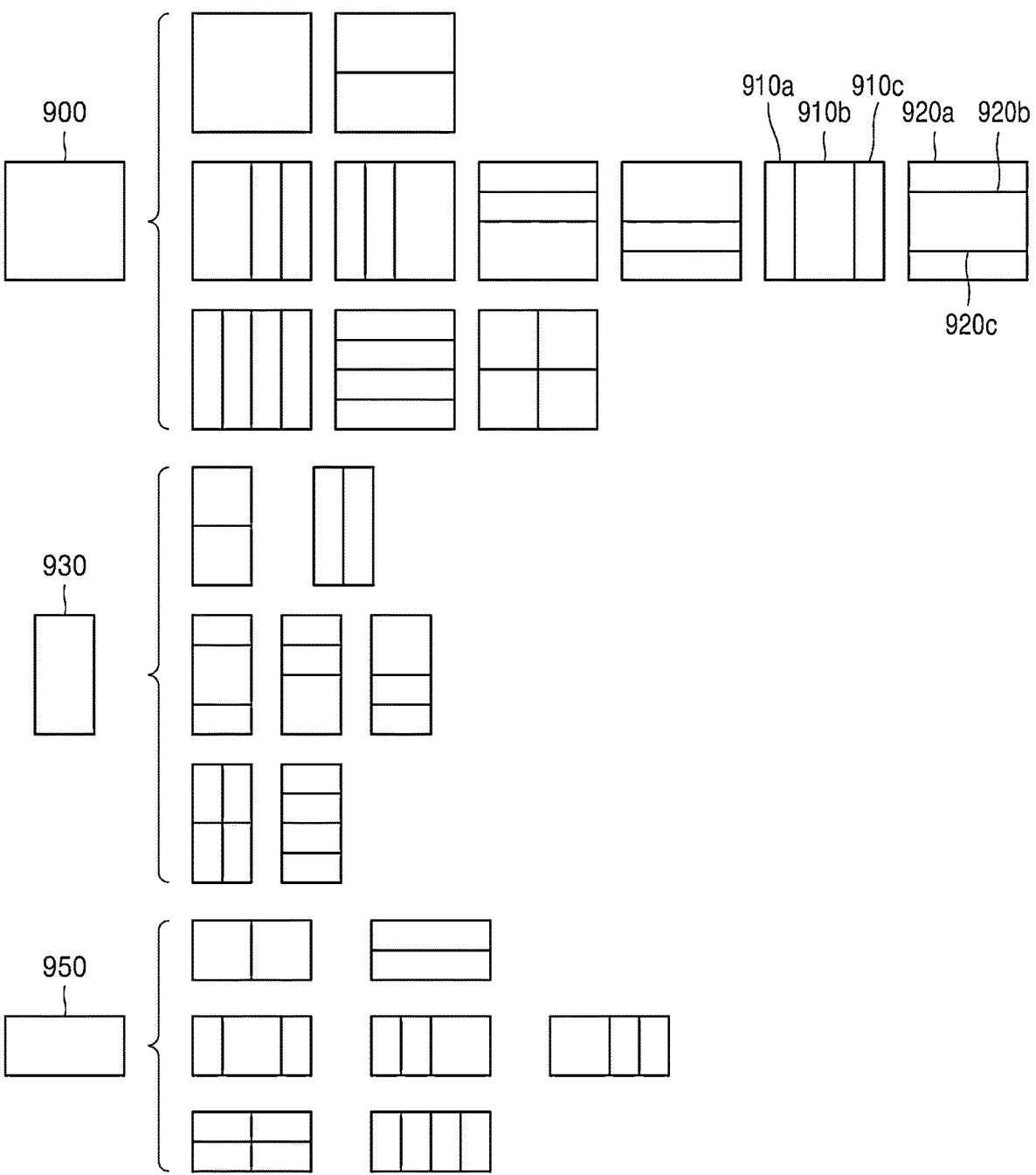
FIG. 9 illustrates a process, performed by an image decoding apparatus, of determining at least one coding unit by splitting a first coding unit, according to an example embodiment.

FIG. 9 illustrates a process, performed by an image decoding apparatus, of determining at least one coding unit by splitting a first coding unit, according to an example embodiment.

According to an example embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an example embodiment, the image decoding apparatus 100 may determine whether the second coding units 910*a*, 910*b*, 910*c*, 920*a*, 920*b*, and 920*c* included in the first coding unit 900 satisfy a condition for processing in a certain order, and the condition relates to whether at least one of a width or height of the first coding unit 900 is split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920*a*, 920*b*, and 920*c* determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an example embodiment, when a coding unit is split into an odd number of coding units, the image decoding apparatus 100 may put a certain restriction on a coding unit at a certain location from among the split coding units. The restriction or the certain location has been described above in relation to various example embodiments, and thus detailed descriptions thereof are not provided again.

According to an example embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
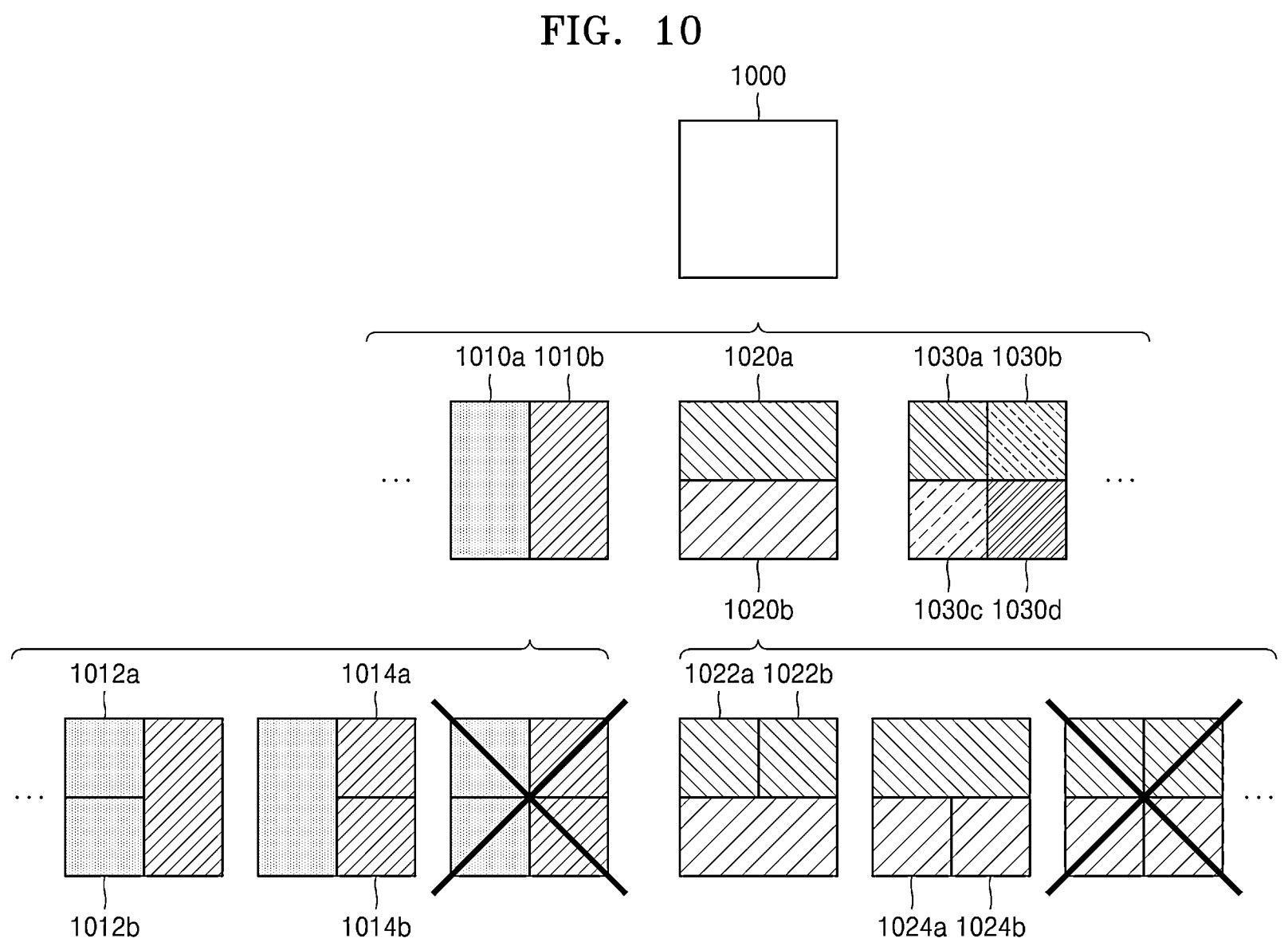

FIG. 10 illustrates that a shape into which a second coding unit is splittable is restricted when the second coding unit having a non-square shape, which is determined when an image decoding apparatus splits a first coding unit, satisfies a certain condition, according to an example embodiment.

According to an example embodiment, the image decoding apparatus 100 may determine to split the square first coding unit 1000 into non-square second coding units 1010*a*, and 1010*b* or 1020*a* and 1020*b*, based on split shape mode information, which is obtained by the receiver 110. The second coding units 1010*a* and 1010*b* or 1020*a* and 1020*b* may be independently split. As such, the image decoding apparatus 100 may determine to split or not to split each of the second coding units 1010*a* and 1010*b* or 1020*a* and 1020*b* into a plurality of coding units, based on the split shape mode information of each of the second coding units 1010*a* and 1010*b* or 1020*a* and 1020*b*. According to an example embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* not to be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b* or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an example embodiment, the image decoding apparatus 100 may determine third coding units 1022*a* and 1022*b* or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) not to be split in a vertical direction in which the upper second coding unit 1020*a* is split.

Figure 11:
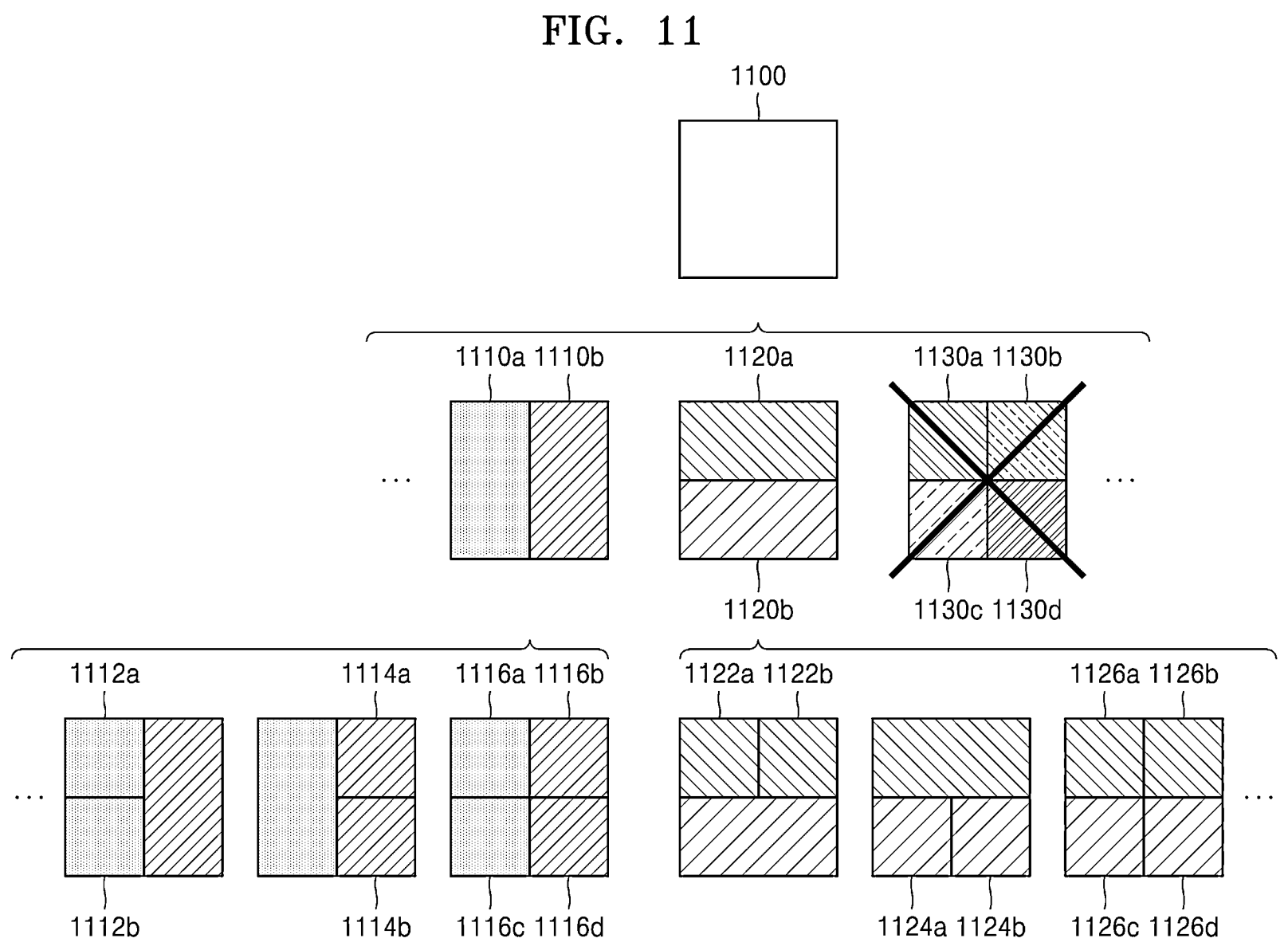

FIG. 11 illustrates a process, performed by an image decoding apparatus, of splitting a square coding unit when split shape mode information is unable to indicate that the square coding unit is split into four square coding units, according to an example embodiment.

According to an example embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an example embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
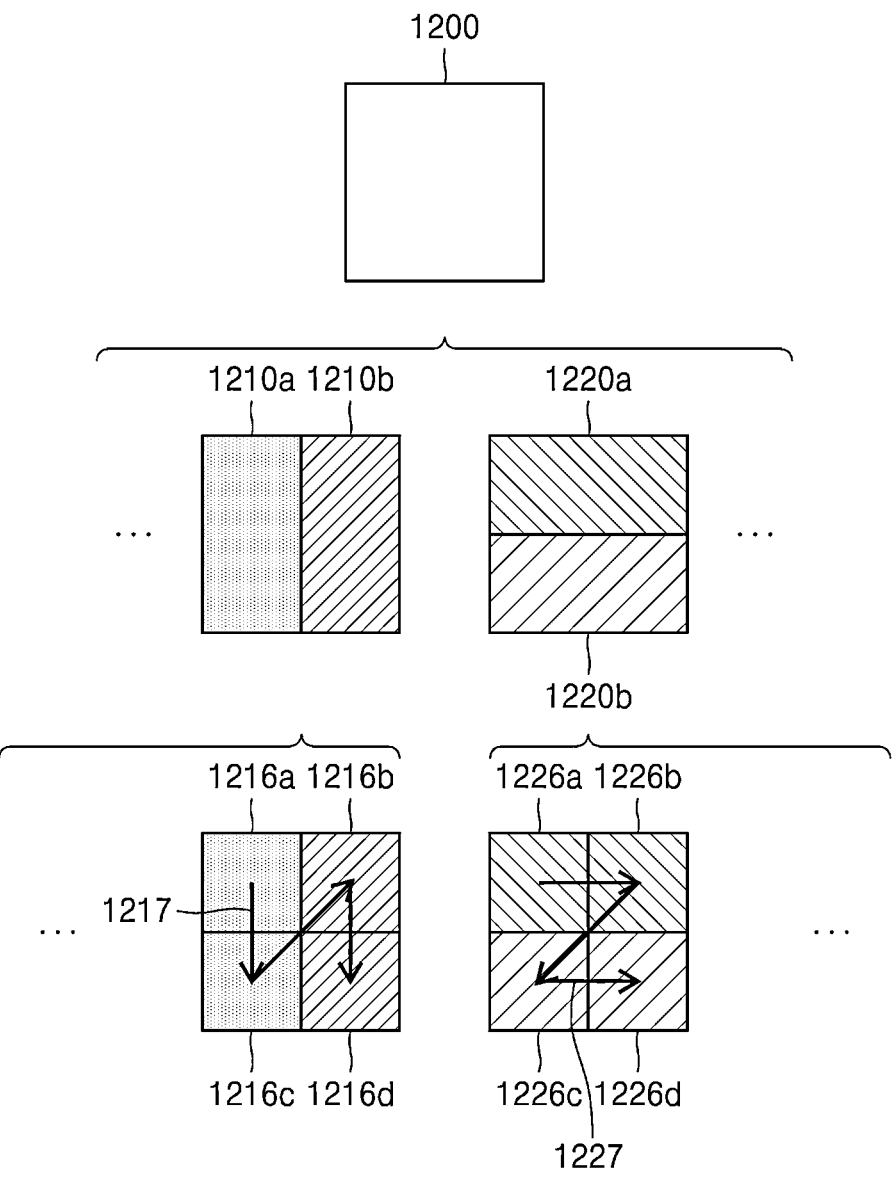
FIG. 12 illustrates that a processing order between a plurality of coding units may be changed depending on a process of splitting a coding unit, according to an example embodiment.

FIG. 12 illustrates that a processing order between a plurality of coding units may be changed depending on a process of splitting a coding unit, according to an example embodiment.

According to an example embodiment, the image decoding apparatus 100 may split a first coding unit 1200, based on split shape mode information. When a block shape indicates a square shape and the split shape mode information indicates to split the first coding unit 1200 in at least one of a horizontal direction or a vertical direction, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a and 1210b or 1220a and 1220b has been described above in relation to FIG. 11, and thus detailed descriptions thereof will not be provided herein.

According to an example embodiment, the image decoding apparatus 100 may process coding units in a certain order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an example embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an example embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an example embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an example embodiment.

According to an example embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an example embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an example embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width or height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an example embodiment, the image decoding apparatus 100 may determine the second coding unit 1302, 1312, or 1322 by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an example embodiment, the image decoding apparatus 100 may determine a third coding unit 1304, 1314, or 1324 by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an example embodiment, the image decoding apparatus 100 may determine the third coding unit 1304, 1314, or 1324 by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an example embodiment, the image decoding apparatus 100 may determine the third coding unit 1304, 1314, or 1324 by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an example embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an example embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an example embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

FIG. 14 illustrates depths that are determinable based on shapes and sizes of coding units, and part indexes (PIDs) that are for distinguishing the coding units, according to an example embodiment.

According to an example embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404*b*, and 1406*a*, 1406*b*, 1406*c*, and 1406*d* by splitting the first coding unit 1400 in at least one of a vertical direction or a horizontal direction based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an example embodiment, a depth of the second coding units 1402*a* and 1402*b*, 1404*a* and 1404*b*, and 1406*a*, 1406*b*, 1406*c*, and 1406*d*, which are determined based on the split shape mode information of the square first coding unit 1400, may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an example embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an example embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an example embodiment, depths of the second coding units 1412*a* and 1412*b*, and 1414*a*, 1414*b*, and 1414*c*, or 1422*a* and 1422*b*, and 1424*a*, 1424*b*, and 1424*c* that are determined based on the split shape mode information of the non-square first coding unit 1410 or 1420 may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an example embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an example embodiment, the image decoding apparatus 100 may determine whether an odd number of split coding units do not have equal sizes, based on whether discontinuity is present in PIDs for identifying the split coding units.

According to an example embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an example embodiment, the PID may be obtained from a sample of a certain location of each coding unit (e.g., an upper left sample).

According to an example embodiment, the image decoding apparatus 100 may determine a coding unit at a certain location from among the split coding units, by using the PIDs for distinguishing the coding units. According to an example embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an example embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an example embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an example embodiment, the image decoding apparatus 100 may use a certain data unit where a coding unit starts to be recursively split.

FIG. 15 illustrates that a plurality of coding units are determined based on a plurality of certain data units included in a picture, according to an example embodiment.

According to an example embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an example embodiment, the reference data unit may have a certain size and a certain size shape. According to an example embodiment, the reference data unit may include M×N samples. Herein, M and N may be equal to each other, and may be integers expressed as powers of 2. That is, the reference data unit may have a square or non-square shape, and may be split into an integer number of coding units.

According to an example embodiment, the image decoding apparatus 100 may split the current picture into a plurality of reference data units. According to an example embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an example embodiment, the image decoding apparatus 100 may previously determine the smallest size allowed for the reference data units included in the current picture. Accordingly, the image decoding apparatus 100 may determine various reference data units having sizes equal to or greater than the smallest size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an example embodiment, the shape and size of reference coding units may be determined based on various data units capable of including one or more reference coding units (e.g., sequences, pictures, slices, slice segments, tiles, tile groups, largest coding units, or the like).

According to an example embodiment, the receiver 110 of the image decoding apparatus 100 may obtain, from a bitstream, at least one of reference coding unit shape information or reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof are not provided again.

According to an example embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size or shape of reference coding units corresponding to the PID for identifying the size and shape of reference coding units may be previously determined. That is, the image decoding apparatus 100 may determine at least one of the size or shape of reference coding units included in a data unit serving as a unit for obtaining the PID, by selecting the previously determined at least one of the size or shape of reference coding units based on the PID.

According to an example embodiment, the image decoding apparatus 100 may use one or more reference coding units included in a largest coding unit. That is, a largest coding unit split from a picture may include one or more reference coding units, and coding units may be determined by recursively splitting each reference coding unit. According to an example embodiment, at least one of a width or height of the largest coding unit may be integer times at least one of the width or height of the reference coding units. According to an example embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information or the split shape mode information according to various example embodiments.

According to an example embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an example embodiment of the present disclosure will be described in detail.

The image decoding apparatus 100 may determine a split rule of an image. The split rule may be pre-determined between the image decoding apparatus 100 and the encoding device 1600. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a height to width ratio, and a direction of the coding unit. The image decoding apparatus 100 may pre-determine to determine the split rule based on block shape information of a coding unit. However, the present disclosure is not limited thereto. The image decoding apparatus 100 may determine the split rule of the image, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

A size of the coding unit may include various sizes, such as 4×4, 8×4, 4×8, 8×8, 16×4, 16×8, . . . , 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The height to width ratio of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, the present disclosure is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

FIG. 16 is a block diagram of an image encoding and decoding system. According to an example embodiment, the image encoding and decoding system may include an encoding device 1600 and a decoding device 1650.

According to an example embodiment, the encoding device 1600 of the image encoding and decoding system transmits an encoded bitstream of an image and the decoding device 1650 outputs a reconstructed image by receiving and decoding the bitstream. Here, the decoding device 1650 may have a similar configuration as the image decoding apparatus 100.

According to an example embodiment, the encoding device 1600 may include an inter predictor 1605, an intra predictor 1610, an adder 1615, a transformer 1620, a quantizer 1625, an entropy encoder 1630, an inverse-quantizer 1633, an inverse-transformer 1635, a post-reconstruction filter 1640, an in-loop filter 1645, a decoded picture buffer (DPB) 1648 and an adder 1649.

According to an example embodiment, the inter predictor 1605 generates motion information of a current block indicating a reference block of a reference picture temporally adjacent to a current picture, when a prediction mode of a current block is an inter prediction mode. The inter predictor 1605 may determine prediction samples of the current block by using samples of reference blocks. According to an example embodiment, the intra predictor 1610 may determine intra prediction information indicating a method of determining prediction samples or directions in which neighboring samples similar to the current block are located, such that the prediction samples of the current block are determined by using the neighboring samples spatially adjacent to the current block. The inter predictor 1605 and the intra predictor 1610 may determine reference samples to be used for prediction of the current block, from among pre-reconstructed samples stored in a decoded picture buffer (DPB) 1648.

According to an example embodiment, the transformer 1620 outputs transform coefficients by performing transform on residual sample values obtained by subtracting prediction samples generated by the inter predictor 1605 or intra predictor 1610, from an original sample of the current block at adder 1615. According to an example embodiment, the quantizer 1625 quantizes the transform coefficients output from the transformer 1620 and outputs the quantized transform coefficients. According to an example embodiment, the entropy encoder 1630 may encode the quantized transform coefficients with residual syntax elements including a level value and output the same in a form of a bitstream.

The quantized transform coefficients output from the quantizer 1625 may be inverse-quantized and inverse-transformed via the inverse-quantizer 1633 and the inverse-transformer 1635, and thus the residual sample values may be generated again.

The residual sample values and the prediction sample values are added at an adder 1649, and thus reconstructed sample values are output. A post-reconstruction filter 1640 performs post-reconstruction filtering on reconstructed samples, and the reconstructed sample values updated via the post-reconstruction filtering may be used as reference sample values for intra prediction to be performed by the intra predictor 1610. The post-reconstruction filter 1640 may perform Hadamard transform domain filtering or bilateral filtering on the reconstructed sample values.

According to an example embodiment, the in-loop filter 1645 may perform at least one of deblocking filtering or adaptive loop filtering on the reconstructed samples updated via the post-reconstruction filtering. The reconstructed sample values updated via filtering by the in-loop filter 1645 may be stored in the DPB 1648, and may be used as reference sample values for inter prediction to be performed by the inter predictor 1605.

According to an example embodiment, the decoding device 1650 may include an inter predictor 1670, an intra predictor 1675, an inverse transformer 1665, an inverse quantizer 1660, an entropy decoder 1655, a post-reconstruction filter 1680, an in-loop filter 1685, a decoded picture buffer (DPB) 1690 and an adder 1695.

According to an example embodiment, the entropy decoder 1655 of the decoding device 1650 may perform entropy decoding on the received bitstream to parse the residual syntax elements including the level value. The quantized transform coefficients may be reconstructed from the residual syntax elements. According to an example embodiment, the inverse quantizer 1660 may output the transform coefficients by performing inverse quantization on the quantized transform coefficients, and the inverse transformer 1665 may output the residual sample values by performing inverse transformation on the transform coefficients.

According to an example embodiment, the inter predictor 1670 of the decoding device 1650 may determine the reference picture temporally adjacent to the current picture by using the motion information of the current block parsed by the entropy decoder 1655, and determine the reference block in the reference picture. The inter predictor 1670 may determine the prediction samples of the current block by using the samples of the reference blocks. According to an example embodiment, the intra predictor 1675 of the decoding device 1650 may determine the reference samples spatially adjacent to the current block by using the intra prediction information, by using the motion information of the current block parsed by the entropy decoder 1655, and determine the prediction samples of the current block by using the determined neighboring samples. The inter predictor 1670 and the intra predictor 1675 may determine the reference samples to be used for prediction of the current block, from among pre-reconstructed samples stored in a DPB 1690.

The residual sample values and the prediction sample values are added at an adder 1695 of the decoding device 1650, and thus the reconstructed sample values of the current block are output. A post-reconstruction filter 1680 of the decoding device 1650 may perform Hadamard transform domain filtering or bilateral filtering on the reconstructed sample values. The reconstructed sample values updated via filtering by the post-reconstruction filter 1680 may be used as reference sample values for intra prediction to be performed by the intra predictor 1675.

An in-loop filter 1685 of the decoding device 1650 may perform at least one of deblocking filtering or adaptive loop filtering on the reconstructed samples updated via the post-reconstruction filtering. The reconstructed sample values updated via the filtering by the in-loop filter 1685 may be stored in the DPB 1690, and may be used as reference sample values for inter prediction to be performed by the inter predictor 1670.

FIG. 17 illustrates an image decoding process including post-reconstruction filtering.

A video decoding process according to an example embodiment includes parsing 1710, predicting 1720, inverse-quantizing 1730, inverse-transforming 1740, reconstructing 1750, and post-reconstruction filtering 1760. In detail, during the parsing 1710, syntax elements including prediction information and residual syntax elements including a level value are obtained by using syntax elements of a current block parsed from a bitstream. During the predicting 1720, a prediction mode of the current block is determined from the syntax elements including the prediction information, and prediction samples of the current block may be output by performing prediction according to the prediction mode. During the inverse-quantizing 1730, inverse-quantization is performed on residual samples reconstructed from the residual syntax elements, and thus transform coefficients of the residual samples may be output. During the inverse-transforming 1740, residual samples of the current block may be output by performing inverse-transform on the transform coefficients of the residual samples (When the prediction mode determined during the predicting 1720 is a skip mode, the inverse-quantizing 1730 and the inverse-transforming 1740 may be omitted.).

During the reconstructing 1750, reconstructed samples of the current block may be output by combining the prediction samples of the current block and the residual samples of the current block.

During the post-reconstruction filtering 1760, the reconstructed samples may be updated and output by performing Hadamard transform domain filtering or bilateral filtering on the reconstructed samples output during the reconstructing 1750. The reconstructed samples updated via the post-reconstruction filtering may be used as reference samples for intra prediction of a block neighboring the current block.

After the post-reconstruction filtering 1760, in-loop filtering may be performed on the reconstructed samples to update the reconstructed samples. The reconstructed samples updated via the in-loop filtering may be stored in a DPB and used as reference samples for inter prediction of another block.

In the video decoding process illustrated in FIG. 17, not only the prediction during the predicting 1720, but also the filtering during the post-reconstruction filtering 1760 use samples (neighboring samples) of a neighboring block adjacent to the current block, and thus it is required to determine availability of the neighboring samples before an operation. A video encoding method and a video decoding method, according to an example embodiment, provide a method of how to perform an operation on a current block when neighboring samples include an error or are not reconstructed. In other words, a case where an error occurs in reconstructed samples around a current block may include a case where a packet is lost in a communication environment, a case where slice information is lost, a case where picture information is lost, or the like. A method of minimizing the occurrence of error propagation caused by an error of neighboring samples during a coding process of a current block is provided.

According to an example embodiment, the video decoding process may be performed in the processing operations in the order illustrated in FIG. 17. However, the disclosure is not limited to the processing operations or the order illustrated in FIG. 17, and as such, according to another example embodiment, the video decoding process include different processing operations or a different order of processing operations.

A method of verifying availability of a neighboring reconstructed sample of a current block will be described with reference to FIG. 23.

FIG. 23 illustrates a process of verifying availability of a neighboring sample adjacent to a current block, according to an example embodiment.

In intra prediction of the high efficiency video coding (HEVC) standard or the MPEG-5 essential video coding (EVC) standard that is being standardized, a constrained intra prediction mode may be enabled in an environment where an error occurs often. When availability of a reference sample referred to while intra prediction of a current block is checked in the constrained intra prediction mode, the availability of the reference sample may be determined to be TRUE only when a prediction mode of a reference block additionally including the reference sample is an intra prediction mode, i.e., when the reference block has been reconstructed in the intra prediction mode. In other words, the intra prediction of the current block may be performed by using the reference sample. On the other hand, when the constrained intra prediction mode is disabled, the prediction mode of the reference block is not considered while verifying the availability of the reference sample.

For example, a process 2300 of determining a variable availableN indicating availability of a reference sample at a location (xNbY, yNbY) is as follows. Availability information AvailableN of the reference sample is determined to be FALSE, i.e., an unavailable reference sample, when the reference sample is contained in different slice or tile (2310), when a location of the reference sample is outside a picture (2320), or when reconstruction of the reference sample is not complete (2330).

When the constrained intra prediction mode is enabled, it needs to be additionally verified whether a prediction mode of a block at the location (xNbY, yNbY) is an intra prediction mode, in addition to the availability information availableN about the reference sample at the location (xNbY, yNbY) used for intra prediction, so as to perform the intra prediction of the current block. When the constrained intra prediction mode is disabled, it may be determined whether the intra prediction of the current block is performable by using the reference sample, based on availableN of the reference sample. Accordingly, when the constrained intra prediction mode is enabled, an error propagation phenomenon may be minimized because a neighboring sample reconstructed by using another picture, i.e., a neighboring sample reconstructed in an inter prediction mode, is not used to perform the intra prediction of the current block.

The operation is performed by using the neighboring sample of the current block for not only the intra prediction, but also post-reconstruction filtering. Detailed description about Hadamard transform domain filtering that is a type of the post-reconstruction filtering will be described with reference to FIG. 18.

FIG. 18 illustrates a reference region for post-reconstruction filtering.

When the post-reconstruction filtering is performed, image information reconstructed around a current block may be used, according to a size or shape of a filter tab. In other words, the post-reconstruction filtering may be performed on a padding region 1820 expanded by N samples 1810 in a vertical direction from an outer line of a current block 1800 in FIG. 18. According to an example embodiment, the padding region 1820 may be expanded by N samples 1810 to surround the current block 1800. Here, N may vary depending on the size or shape of the filter tab. When the reconstructed image information is present in the padding region 1820, the reconstructed image information present in the padding region 1820 may be used during the post-reconstruction filtering.

For example, the padding region 1820 is expanded by setting N to 1, when 2×2 Hadamard transform domain filtering is performed. When a pre-reconstructed sample is present in the padding region 1820, pre-reconstructed information may be used to perform filtering. However, when a reference sample located in the padding region 1820 is not available, the reference sample of the padding region 1820 may be padded by replacing a sample value of a reconstructed sample of the current block adjacent to the reference sample with a padding value of the reference sample.

A video encoding method and decoding method, and a video encoding apparatus and decoding apparatus, according to an example embodiment, propose a method of performing post-reconstruction filtering on a current block when a constrained prediction mode is enabled. Hereinafter, a method and apparatus for encoding or decoding a video by performing post-reconstruction filtering, according to an example embodiment of the disclosure will be described with reference to FIGS. 19 through 22.

Hereinafter, a largest size of a coding unit denotes a largest size of a long side among a width and height of the coding unit, and a smallest size of a coding unit denotes a smallest size of a long side among a width and height of the coding unit.

Hereinafter a tree structure may denote a hierarchical structure of one or more coding units formed depending on whether a split mode of a coding unit is a quad split, a binary split, a ternary split, or a non-split. For example, a hierarchical structure of blocks generated from a current coding unit according to a split process of FIG. 5 is referred to as a tree structure.

FIG. 19 is a block diagram of a video decoding apparatus according to an example embodiment.

Referring to FIG. 19, a video decoding apparatus 1900 according to an example embodiment may include an obtainer 1910, a reconstructor 1920, and a post-reconstruction filter 1930.

The video decoding apparatus 1900 may obtain a bitstream generated as a result of encoding an image, determine locations of blocks split from a picture, based on information included in the bitstream, and decode the blocks, such as a largest coding unit and a coding unit.

The video decoding apparatus 1900 according to an example embodiment may include a processor for implementing the obtainer 1910, the reconstructor 1920, and the post-reconstruction filter 1930. According to an example embodiment, the processor may be a central processing unit (CPU), but the disclosure is not limited thereto, and as such, according to another example embodiment, the obtainer 1910, the reconstructor 1920, and the post-reconstruction filter 1930 may operate respectively by their own processors, and the processors may operate systematically such that the video decoding apparatus 1900 operates as a whole. Alternatively, the obtainer 1910, the reconstructor 1920, and the post-reconstruction filter 1930 may be controlled under control by an external processor of the video decoding apparatus 1900.

The video decoding apparatus 1900 may include at least one data storage storing input and output data of the obtainer 1910, the reconstructor 1920, and the post-reconstruction filter 1930. The video decoding apparatus 1900 may include a memory controller for controlling data input and output of the data storage.

The video decoding apparatus 1900 may perform an image decoding operation including prediction by connectively operating with an internal video decoding processor or an external video decoding processor so as to reconstruct an image via image decoding. The internal video decoding processor of the video decoding apparatus 1900 according to an example embodiment may perform a basic image decoding operation when not only a separate processor but also a central processing apparatus or a graphic processing apparatus include an image decoding processing module.

The video decoding apparatus 1900 may be included in the image decoding apparatus 100 described above. For example, the obtainer 1910 may correspond to the receiver 110 of the image decoding apparatus 100, and the reconstructor 1920 and post-reconstruction filter 1930 may correspond to the decoder 120 of the image decoding apparatus 100. The video decoding apparatus 1900 may correspond to the decoding device 1650 of the image encoding and decoding system described above with reference to FIG. 16. For example, the obtainer 1910 may correspond to the entropy decoder 1655 of the decoding device 1650, the reconstructor 1920 may include the inverse quantizer 1660, the inverse transformer 1665, the inter predictor 1670, the intra predictor 1675, the adder 1695, and the in-loop filter 1685 of the decoding device 1650, and the post-reconstruction filter 1930 may correspond to the post-reconstruction filter 1680 of the decoding device 1650.

The obtainer 1910 receives a bitstream generated as a result of encoding an image. The bitstream may include information about a current picture. A picture may include one or more largest coding units. The reconstructor 1920 may determine a location of a current block in the picture, based on the information obtained from the bitstream. The current block is a block generated when the picture is split according to a tree structure, and for example, may correspond to a largest coding unit or a coding unit. The reconstructor 1920 determines whether to further split the current block into subblocks of lower depths, and may determine the tree structure of the current block. The lower depth may be determined by adding the number of splits from the current block to the subblocks to a current depth of the current block. Among blocks forming the tree structure included in the current picture, blocks located at tree leaves are blocks that are no longer split. Accordingly, the reconstructor 1920 may decode one or more blocks that are no longer split by performing inverse quantization, inverse transformation, and prediction on the blocks.

The reconstructor 1920 may generate prediction samples of the current block by performing prediction on the current block. The reconstructor 1920 may generate residual samples of the current block by performing inverse transformation on the current block. The reconstructor 1920 may generate reconstructed samples of the current block by using the prediction samples of the current block and the residual samples of the current block. The reconstructor 1920 may reconstruct the current picture by reconstructing samples for each block.

For example, when a prediction mode of the current block is an intra mode, the reconstructor 1920 may determine a reference sample among samples of a spatial neighboring block located in an intra prediction direction, by using intra prediction information of the current block, and determine prediction samples corresponding to the current block, by using the reference sample.

For example, when the prediction mode of the current block is an inter mode, the reconstructor 1920 may reconstruct the current block by using a motion vector of the current block. The reconstructor 1920 may determine a reference block in a reference picture by using the motion vector of the current block, and determine the prediction samples corresponding to the current block from reference samples included in the reference block. The reconstructor 1920 may reconstruct transform coefficients by using a transform coefficient level obtained from the bitstream, and reconstruct residual samples by performing inverse quantization and inverse transformation on the transform coefficients. The reconstructor 1920 may determine the reconstructed samples of the current block by combining the prediction samples and residual samples corresponding to the current block.

When the current block is predicted in a skip mode, the reconstructor 1920 may not need to parse the transform coefficients of the current block from the bitstream. The reconstructor 1920 may determine the reconstructed samples of the current block by using the prediction samples of the current block as they are.

The obtainer 1910 according to an example embodiment may obtain constrained prediction information indicating whether a constrained intra prediction mode is enabled.

The post-reconstruction filter 1930 according to an example embodiment may perform post-reconstruction filtering by using at least one of the reconstructed sample of the current block or a padding value corresponding to a neighboring sample. For example, when the current block is not outside a filtering target area, the post-reconstruction filtering may be performed by using the reconstructed samples of the current block. Here, the filtering target area may include the current block and an outer area of the current block. In this case, the post-reconstruction filter 1930 may pad the outer area of the current block with a specific sample value. The post-reconstruction filter 1930 may perform filtering on the reconstructed samples of the current block adjacent to an outline of the current block, by using the padded sample value (hereinafter, referred to as a padding value).

In detail, when the constrained prediction information indicates the constrained intra prediction mode and a prediction mode of the neighboring block is not an intra prediction mode, the post-reconstruction filter 1930 may pad the neighboring sample adjacent to the outside of a boundary between the current block and the neighboring block, by using the reconstructed sample of the current block. The post-reconstruction filter 1930 may perform the post-reconstruction filtering on the current block by using the padding value corresponding to the neighboring sample.

Hereinafter, a video decoding method wherein the video decoding apparatus 1900 according to an example embodiment adds an outer area of a current block and uses the same for post-reconstruction filtering will be described with reference to FIG. 20.

FIG. 20 is a flowchart of a video decoding method according to an example embodiment.

In operation 2010, the obtainer 1910 may obtain constrained prediction information indicating whether a constrained intra prediction mode is enabled. The constrained prediction information may be obtained from a picture parameter set. Accordingly, the constrained prediction information may indicate whether the constrained intra prediction mode is enabled for a current picture. When the constrained intra prediction mode of the current picture is enabled, the constrained intra prediction mode may also be enabled for a current block included in the current picture.

In operation 2020, the reconstructor 1920 may generate reconstructed samples of the current block by using prediction samples of the current block and residual samples of the current block.

The reconstructor 1920 according to an example embodiment may generate the prediction samples of the current block by performing prediction on the current block. The reconstructor 1920 according to an example embodiment may generate the residual samples of the current block by performing inverse transformation on the current block. However, when the current block is predicted in a skip mode, the reconstructor 1920 may determine a sample value of the residual sample to be 0. The reconstructor 1920 may determine, as sample values of the reconstructed samples of the current block, values obtained by adding the prediction samples of the current block and the residual samples of the current block.

In operation 2030, when the constrained intra prediction mode is enabled according to the constrained prediction information and a prediction mode of a neighboring block is not an intra prediction mode, the post-reconstruction filter 1930 may pad a neighboring sample adjacent to the outside of a boundary between the current block and the neighboring block, by using the reconstructed samples of the current block.

The post-reconstruction filter 1930 according to an example embodiment may determine the padding value corresponding to the neighboring sample located outside the boundary between the current block and the neighboring block to be the same as a reconstructed sample value of the current block adjacent to the boundary.

When a sample of the neighboring block adjacent to the current block is not available for prediction of the current block, the post-reconstruction filter 1930 according to an example embodiment may determine the padding value corresponding to the neighboring sample located outside the boundary between the current block and the neighboring block to be the same as the reconstructed sample value of the current block adjacent to the boundary.

In operation 2040, the post-reconstruction filter 1930 may perform post-reconstruction filtering on the current block by using the padding value corresponding to the neighboring sample. The post-reconstruction filter 1930 may perform the post-reconstruction filtering on the current block by using padded sample values of the neighboring samples, i.e., the padding values corresponding to neighboring samples.

The post-reconstruction filter 1930 may perform Hadamard transform domain filtering by using the reconstructed samples of the current block adjacent to the boundary of the current block and the padding values corresponding to the neighboring samples adjacent to the boundary. For example, the post-reconstruction filter 1930 may perform 2×2 Hadamard transform domain filtering by using two reconstructed samples of the current block adjacent to the boundary of the current block and the padding values corresponding to two neighboring samples adjacent to the boundary.

In detail, the Hadamard transform domain filtering may be applied to a luma reconstruction block in which a quantization parameter is greater than 18 and a multiplication of a height and width of a block is 64 or greater. A filter parameter may be determined based on a lookup table and a quantization parameter. The post-reconstruction filter 1930 may determine a 2×2 area including a current reconstructed sample and neighboring reconstructed samples surrounding a current sample, and output four transform coefficients by performing Hadamard transform on four reconstructed samples included in the 2×2 area, in particular, on four padding samples when padded samples are included. Secondary components may be generated by performing inverse Hadamard transform on primary components generated by performing filtering on the transform coefficient by using the lookup table. A filtered sample value of the current reconstructed sample may be determined when the secondary components are overlapped. The post-reconstruction filter 1930 may perform the Hadamard transform domain filtering on the reconstructed samples included in the current block.

The post-reconstruction filter 1930 according to another example embodiment may perform bilateral filtering by using the reconstructed samples of the current block adjacent to the boundary of the current block and the padding values corresponding to the neighboring samples adjacent to the boundary.

The reconstructed samples of the current block updated via the post-reconstruction filtering by the post-reconstruction filter 1930 may be used to perform intra prediction of another block adjacent to the current block.

The video decoding apparatus 1900 according to an example embodiment may update sample values of the reconstructed samples by performing in-loop filtering on the reconstructed samples of the current block updated via the post-reconstruction filtering. The in-loop filtering may include deblocking filtering and adaptive loop filtering (ALF). The reconstructed samples updated via the in-loop filtering may be used as reference samples for inter prediction of a block of a picture other than the current picture.

Thus, the video decoding apparatus 1900 according to an example embodiment does not perform the post-reconstruction filtering using the sample value of the neighboring block, considering that reliability of the neighboring sample is low, not only when a reconstructed sample of the neighboring block is not available due to a poor communication environment or coding environment, but also when the constrained intra prediction mode is enabled and the neighboring block is not reconstructed in an intra prediction mode. When the constrained intra prediction mode is enabled and the neighboring block is not reconstructed in the intra prediction mode, the video decoding apparatus 1900 may use only the reconstructed sample value of the current block for the post-reconstruction filtering, by padding the neighboring samples adjacent to the outside of the current block by using the reconstructed sample value of the current block adjacent to the outline of the current block instead of the sample value of the neighboring block. Accordingly, a phenomenon in which an error occurred from another block is propagated may be minimized during a process of reconstructing the current block.

Hereinafter, a video encoding apparatus for performing post-reconstruction filtering using a sample of a neighboring block will be described with reference to FIG. 21.

FIG. 21 is a block diagram of a video encoding apparatus according to an example embodiment.

Referring to FIG. 21, a video encoding apparatus 2100 according to an example embodiment may include an information encoder 2110, a reconstructor 2120, and a post-reconstruction filter 2130.

The information encoder according to an example embodiment may generate constrained prediction information indicating whether a constrained intra prediction mode is enabled, perform entropy encoding on the constrained prediction information, and output the same in a form of a bitstream.

The video encoding apparatus 2100 according to an example embodiment may split a picture in one or more luma coding units and encode coding units.

The video encoding apparatus 2100 according to an example embodiment may include a processor for implementing the information encoder 2110, the reconstructor 2120, and the post-reconstruction filter 2130. According to an example embodiment, the processor may be a central processing unit (CPU), but the disclosure is not limited thereto, and as such, according to another example embodiment, the information encoder 2110, the reconstructor 2120, and the post-reconstruction filter 2130 may operate respectively by their own processors, and the processors may operate systematically such that the video encoding apparatus 2100 operates as a whole. Alternatively, the information encoder 2110, the reconstructor 2120, and the post-reconstruction filter 2130 may be controlled under control by an external processor of the video encoding apparatus 2100.

The video encoding apparatus 2100 may include at least one data storage storing input and output data of the information encoder 2110, the reconstructor 2120, and the post-reconstruction filter 2130. The video encoding apparatus 2100 may include a memory controller for controlling data input and output of the data storage.

The video encoding apparatus 2100 may perform an image encoding operation including prediction by connectively operating with an internal video encoding processor or an external video encoding processor, for image encoding. The internal video encoding processor of the video encoding apparatus 2100 according to an example embodiment may perform a basic image encoding operation when not only a separate processor but also a central processing apparatus (CPU) or a graphic processing apparatus (GPU) include an image encoding processing module.

The video encoding apparatus 2100 may correspond to the encoding device 1600 of the image encoding and decoding system described above with reference to FIG. 16. For example, the information encoder 2110 may include the inter predictor 1605, the intra predictor 1610, the transformer 1620, the quantizer 1625, and the entropy encoder 1630 of the encoding device 1600. The reconstructor 2120 may include the inverse-quantizer 1633, the inverse-transformer 1635, the adder 1615, and the in-loop filter 1645 of the encoding device 1600, and the post-reconstruction filter 1930 may correspond to the post-reconstruction filter 1640 of the encoding device 1600.

The information encoder 2110 according to an example embodiment may split the picture into a plurality of largest coding units, and split each largest coding unit into blocks having various sizes and various shapes for encoding.

For example, when a prediction mode of a current block is an intra mode, the information encoder 2110 may determine a reference sample among samples of a spatial neighboring block located in an intra prediction direction of the current block, and determine prediction samples corresponding to the current block, by using the reference sample.

For example, when the current block is predicted in a skip mode, the information encoder 2110 may determine a motion vector for predicting the current block. The information encoder 2110 may determine a reference block of the current block from a reference picture, and determine a motion vector indicating the reference block from the current block. In the skip mode, a residual block may not need to be encoded.

For example, when a prediction mode of the current block is an inter mode, the information encoder 2110 may determine the motion vector for predicting the current block. The information encoder 2110 may determine the reference block of the current block from the reference picture, and determine the motion vector indicating the reference block from the current block. The information encoder 2110 may determine a residual sample between the current blocks from reference samples included in the reference block, and generate a quantized transform coefficient by performing transformation and quantization on the residual sample, based on a transform unit.

The current block is a block generated when an image is split according to a tree structure, and for example, may correspond to a largest coding unit, a coding unit, or a transform unit. The information encoder 2110 may encode blocks included in a picture according to an encoding order.

The information encoder 2110 may output a bitstream including syntax elements corresponding to various pieces of encoding information determined as results of encoding luma blocks. In detail, the information encoder 2110 may generate constrained prediction information indicating a constrained intra prediction mode and add the same to a picture parameter set.

The reconstructor 2120 according to an example embodiment may generate reconstructed samples of the current block by using prediction samples of the current block and residual samples of the current block.

When the constrained intra prediction mode is enabled and a prediction mode of the neighboring block is not an intra prediction mode, the post-reconstruction filter 2130 according to an example embodiment may pad a neighboring sample adjacent to the outside of a boundary between the current block and the neighboring block, by using the reconstructed samples of the current block.

The post-reconstruction filter 2130 according to an example embodiment may perform post-reconstruction filtering on the current block by using the padding value corresponding to the neighboring sample.

Hereinafter, a process by which the video encoding apparatus 2100 performs video encoding is described with reference to FIG. 22.

FIG. 22 is a flowchart of a video encoding method according to an example embodiment.

In operation 2210, the information encoder 2110 may generate constrained prediction information indicating whether a constrained intra prediction mode is enabled. The information encoder 2110 may generate the constrained prediction information such as to indicate whether the constrained intra prediction mode is enabled for a current picture. Accordingly, the constrained prediction information may be output by being included in a picture parameter set. When the constrained intra prediction mode of the current picture is enabled, the constrained intra prediction mode may also be enabled for a current block included in the current picture.

In operation 2220, the reconstructor 2120 may generate reconstructed samples of the current block by using prediction samples of the current block and residual samples of the current block. However, when the current block is predicted in a skip mode, the residual sample is not generated, and thus the reconstructed samples of the current block may be generated by only using the prediction samples of the current block.

In operation 2230, when the constrained intra prediction mode is enabled and a prediction mode of a neighboring block is not an intra prediction mode, the post-reconstruction filter 2130 may pad a neighboring sample adjacent to the outside of a boundary between the current block and the neighboring block, by using the reconstructed samples of the current block.

The post-reconstruction filter 2130 according to an example embodiment may determine the padding value corresponding to the neighboring sample located outside the boundary between the current block and the neighboring block to be the same as a reconstructed sample value of the current block adjacent to the boundary.

When a sample of the neighboring block adjacent to the current block is not available for prediction of the current block, the post-reconstruction filter 2130 according to an example embodiment may determine the padding value corresponding to the neighboring sample located outside the boundary between the current block and the neighboring block to be the same as the reconstructed sample value of the current block adjacent to the boundary.

In operation 2240, the post-reconstruction filter 2130 may perform post-reconstruction filtering on the current block by using the padding value corresponding to the neighboring sample. The post-reconstruction filter 2130 may perform the post-reconstruction filtering on the current block by using padded sample values of the neighboring samples, i.e., the padding values corresponding to neighboring samples.

The post-reconstruction filter 2130 may perform Hadamard transform domain filtering by using the reconstructed samples of the current block adjacent to the boundary of the current block and the padding values corresponding to the neighboring samples adjacent to the boundary. For example, the post-reconstruction filter 2130 may perform 2×2 Hadamard transform domain filtering by using two reconstructed samples of the current block adjacent to the boundary of the current block and the padding values corresponding to two neighboring samples adjacent to the boundary.

The post-reconstruction filter 2130 according to another example embodiment may perform bilateral filtering by using the reconstructed samples of the current block adjacent to the boundary of the current block and the padding values corresponding to the neighboring samples adjacent to the boundary.

The reconstructed samples of the current block updated via the post-reconstruction filtering by the post-reconstruction filter 2130 may be used to perform intra prediction of another block adjacent to the current block. Also, the reconstructed samples of the current block updated via the post-reconstruction filtering may be used to perform inter prediction on a block of a picture other than the current picture.

The video encoding apparatus 2100 according to an example embodiment may update sample values of the reconstructed samples by performing in-loop filtering on the reconstructed samples of the current block updated via the post-reconstruction filtering. The in-loop filtering may include deblocking filtering and adaptive loop filtering (ALF). The reconstructed samples updated via the in-loop filtering may be used as reference samples for inter prediction of another block.

Thus, the video encoding apparatus 2100 according to an example embodiment does not perform the post-reconstruction filtering using the sample value of the neighboring block, considering that reliability of the neighboring sample is low, not only when a reconstructed sample of the neighboring block is not available due to a poor communication environment or coding environment, but also when the constrained intra prediction mode is enabled and the neighboring block is not reconstructed in an intra prediction mode. When the constrained intra prediction mode is enabled and the neighboring block is not reconstructed in the intra prediction mode, the video encoding apparatus 2100 may use only the reconstructed sample value of the current block for the post-reconstruction filtering, by padding the neighboring samples adjacent to the outside of the current block by using the reconstructed sample value of the current block adjacent to the outline of the current block instead of the sample value of the neighboring block. Accordingly, a phenomenon in which an error occurred from another block is propagated may be minimized during a process of reconstructing the current block.

The post-reconstruction filter 2130 and the post-reconstruction filter 1930 according to an example embodiment may determine the padding values corresponding to the neighboring samples adjacent to the outline of the current block, and perform the post-reconstruction filtering by using the padding values. Hereinafter, a process of padding neighboring samples for post-reconstruction filtering will be described with reference to FIGS. 24 and 25.

FIG. 24 illustrates a process of determining a padding value corresponding to a neighboring sample for post-reconstruction filtering with respect to a current block, based on availability of the neighboring sample, according to an example embodiment.

When a location of a sample used for filtering is represented by x, y, the post-reconstruction filter 1930 may determine a padding value recSamplesPad[x] [y] for filtering with respect to a current block. When the location of the sample is inside the current block, the padding value recSamplesPad[x][y] may be determined to be the same as a reconstructed sample value recSamples[x][y] of the current block (operation 2400).

When the location of the sample is not inside the current block, availability availableN of the sample may be determined (operation 2410).

First, an x offset dx and a y offset dy of the padding value are each set to 0. When an x-coordinate of the sample is −1, i.e., when the sample is a neighboring sample adjacent to the outside of a left boundary of the current block in a traverse direction, and availableN of the sample is FALSE, i.e., when the sample is not available, dx is set to 1. When the x-coordinate of the sample is nCbW, i.e., when the sample is a neighboring sample adjacent to the outside of a right boundary of the current block in a traverse direction, and availableN of the sample is FALSE, dx is set to −1. When a y-coordinate of the sample is −1, i.e., when the sample is a neighboring sample adjacent to the outside of an upper boundary of the current block in a longitudinal direction, and availableN of the sample is FALSE, dy is set to 1. When the y-coordinate of the sample is nCbH, i.e., when the sample is a neighboring sample adjacent to the outside of a lower boundary of the current block in a longitudinal direction, and availableN of the sample is FALSE, dy is set to −1 (operation 2420).

When the setting of dx and dy are completed in operation 2420, the padding value recSamplesPad[x] [y] may be determined to be the same as a reconstructed sample value recSamples[x+dx][y+dy] of the current block (operation 2430).

In other words, when the x-coordinate of the sample is −1 and the sample is not available, dx is 1, and thus a padding value recSamplesPad[−1] [y] may be determined to be the same as a reconstructed sample value recSamples[−1+1][y] of the current block, i.e., a reconstructed sample value of the current block adjacent to the inside of the left boundary of the current block in a traverse direction. When the x-coordinate of the sample is nCbW and the sample is not available, dx is −1, and thus a padding value recSamplesPad[nCbW][y] may be determined to be the same as a reconstructed sample value recSamples[nCbW−1][y] of the current block, i.e., a reconstructed sample value of the current block adjacent to the inside of the right boundary of the current block in a traverse direction. When the y-coordinate of the sample is −1 and the sample is not available, dy is 1, and thus a padding value recSamplesPad[x][−1] may be determined to be the same as a reconstructed sample value recSamples[x] [−1+1] of the current block, i.e., a reconstructed sample value of the current block adjacent to the inside of the upper boundary of the current block in a longitudinal direction. When the y-coordinate of the sample is nCbH and the sample is not available, dy is −1, and thus a padding value recSamplesPad[x][nCbH−1] may be determined to be the same as a reconstructed sample value recSamples[x][nCbH−1] of the current block, i.e., a reconstructed sample value of the current block adjacent to the inside of the lower boundary of the current block in a longitudinal direction.

Accordingly, in operation 2420, when the location of the sample to be filtered is a neighboring sample adjacent to the outside of the boundary of the current block and the sample is not available, post-reconstruction filtering may be performed by using a reconstructed sample of the current block adjacent to the inside of the boundary, instead of the sample.

The neighboring sample may be reconstructed while including an error when another picture reconstructed in a communication environment or coding environment where an error may occur is referred to. When such a reconstructed neighboring sample is used to perform the post-reconstruction filtering, the error included in the neighboring sample may also be propagated to the current block. To prevent such error propagation, the video encoding apparatus 2100 and video decoding apparatus 1900 according to an example embodiment may perform post-reconstruction filtering after verifying not only availability of a neighboring sample, but also a prediction mode. Operations of the post-reconstruction filter 1930 and post-reconstruction filter 2130, according to an example embodiment, will be described with reference to FIG. 25.

FIG. 25 illustrates a process of determining a padding value corresponding to a neighboring sample for post-reconstruction filtering with respect to a current block, based on availability of the neighboring sample and a constrained prediction mode, according to an example embodiment.

Conditions for determining the offsets dx and dy in operation 2420 of FIG. 24 are changed in operations 2510 through 2540 of FIG. 25.

In operation 2510, when an x-coordinate of a sample is −1, i.e., when a sample is a neighboring sample adjacent to the outside of a left boundary of a current block in a traverse direction, and when availability availableN of the sample is FALSE or a constrained intra prediction mode is enabled (constraint_intra_pred_flag is equal to 1) and a prediction mode of a neighboring block including the neighboring sample is not an intra prediction mode (CuPredMode[xCb+x] [yCb+y] is not equal to MODE_INTRA), i.e., when the neighboring sample is not reconstructed in the intra prediction mode, dx is set to 1.

In operation 2520, when the x-coordinate of the sample is nCbW, i.e., when the sample is a neighboring sample adjacent to the outside of a right boundary of the current block in a traverse direction, and when the availability availableN of the sample is FALSE or the constrained intra prediction mode is enabled and the prediction mode of the neighboring block including the neighboring sample is not the intra prediction mode, i.e., when the neighboring sample is not reconstructed in the intra prediction mode, dx is set to −1.

In operation 2530, when a y-coordinate of the sample is −1, i.e., when the sample is a neighboring sample adjacent to the outside of an upper boundary of the current block in a longitudinal direction, and when the availability availableN of the sample is FALSE or the constrained intra prediction mode is enabled and the prediction mode of the neighboring block including the neighboring sample is not the intra prediction mode, i.e., when the neighboring sample is not reconstructed in the intra prediction mode, dy is set to 1.

In operation 2540, when the y-coordinate of the sample is nCbH, i.e., when the sample is a neighboring sample adjacent to the outside of a lower boundary of the current block in a longitudinal direction, and when the availability availableN of the sample is FALSE or the constrained intra prediction mode is enabled and the prediction mode of the neighboring block including the neighboring sample is not the intra prediction mode, i.e., when the neighboring sample is not reconstructed in the intra prediction mode, dy is set to −1.

Accordingly, when the x-coordinate of the sample is −1 and the sample is not available, or the constrained intra prediction mode is enabled and the neighboring block including the neighboring sample is not the intra prediction mode (when the neighboring sample is not reconstructed in the intra prediction mode), dx is 1, and thus a padding value recSamplesPad[−1][y] may be determined to be the same as a reconstructed sample value of the current block adjacent to the inside of the left boundary of the current block in a traverse direction.

When the x-coordinate of the sample is nCbW and the sample is not available, or the constrained intra prediction mode is enabled and the neighboring block including the neighboring sample is not the intra prediction mode (when the neighboring sample is not reconstructed in the intra prediction mode), dx is −1, and thus a padding value recSamplesPad[nCbW][y] may be determined to be the same as a reconstructed sample value of the current block adjacent to the inside of the right boundary of the current block in a traverse direction.

When the y-coordinate of the sample is −1 and the sample is not available, or the constrained intra prediction mode is enabled and the neighboring block including the neighboring sample is not the intra prediction mode (when the neighboring sample is not reconstructed in the intra prediction mode), dy is 1, and thus a padding value recSamplesPad[x][−1] may be determined to be the same as a reconstructed sample value of the current block adjacent to the inside of the upper boundary of the current block in a longitudinal direction.

When the y-coordinate of the sample is nCbH and the sample is not available, or the constrained intra prediction mode is enabled and the neighboring block including the neighboring sample is not the intra prediction mode (when the neighboring sample is not reconstructed in the intra prediction mode), dy is −1, and thus a padding value recSamplesPad[x][nCbH−1] may be determined to be the same as a reconstructed sample value of the current block adjacent to the inside of the lower boundary of the current block in a longitudinal direction.

Post-reconstruction filtering is performed on a current sample by using four padding values recSamplesPad[x][y] included in a 2×2 padding area. Accordingly, when four samples covered by a padding area are all reconstructed samples of the current block, the four samples are all available, and thus the four padding values may be determined to be the same as the reconstructed sample values of the current block. Accordingly, the post-reconstruction filtering may be performed by using the reconstructed sample values of the current block.

However, when some of the four samples covered by the padding area are reconstructed samples of the neighboring block, it is not possible to determine a padding value by using a reconstructed sample value of the neighboring block when (i) a reconstructed sample of the neighboring block is not available or (ii) the neighboring block is reconstructed in a prediction mode other than an intra prediction mode while the constrained intra prediction mode is enabled. In this case, the four padding values may be secured by determining a padding value corresponding to the reconstructed sample of the neighboring block by using the reconstructed sample value of the current block adjacent to the reconstructed sample of the neighboring block. Thus, at this time as well, the post-reconstruction filtering is performed by using the reconstructed sample values of the current block. In other words, when (i) the reconstructed sample of the neighboring block is not available or (ii) the neighboring block is reconstructed in a prediction mode other than the intra prediction mode while the constrained intra prediction mode is enabled, it is determined that reliability of the reconstructed sample value of the neighboring block is low, and thus the post-reconstruction filtering is performed using only the reconstructed sample value of the current block instead of the reconstructed sample value of the neighboring block. The video encoding apparatus 2100 and video decoding apparatus 1900 according to an example embodiment may prevent an error occurred at the neighboring block from being propagated to the current block by performing the post-reconstruction filtering considering not only the availability of the neighboring sample, but also whether the constrained intra prediction mode is enabled and the prediction mode of the neighboring block.

Hereinafter, a method of efficiently encoding a syntax related to an intra prediction mode will be described with reference to FIGS. 26 through 31.

Detailed tools used in an intra prediction mode in the current VVC standard may include intra sub-block partitioning (ISP), matrix based intra prediction (MIP), multiple reference line prediction (MRL), and intra block copy (IBC). In the VVC standard, a flag indicating usage of each intra prediction tool is signaled to the intra prediction mode. When the flags indicating the usage of intra prediction tools are all disabled (off state), intra prediction information (information indicating an intra prediction direction) for performing prediction in a normal intra prediction mode is finally signaled. However, when there are more cases where the intra prediction tools are not applied to intra prediction, it is somewhat inefficient to pre-signal all of the flags indicating the usage of intra prediction tools.

The video encoding apparatus 2100 and video decoding apparatus 1900 according to an example embodiment propose a method of first verifying whether prediction is performed in the normal intra prediction mode, and then transmitting flags indicating usage of remaining intra prediction tools.

The flags indicating the usage of remaining intra prediction tools will be described below with reference to FIG. 26 for a case where tools are individually transmitted and with reference to FIG. 27 for a case where two or more intra prediction tools form a set to generate an index indicating enabling/disabling and the index is transmitted.

FIG. 26 illustrates pseudo-code for defining intra prediction when a flag indicating a case of a normal intra prediction mode is present, according to an example embodiment.

When a flag 2610 indicating whether prediction is performed in a normal intra prediction mode is first defined and the prediction according to the normal intra prediction mode is performed, only information 2620 for determining an intra prediction direction may be signaled without having to transmit a flag 2640 indicating usage of another intra prediction tool. In detail, regarding the information 2620 for determining the intra prediction direction, a most probable mode (MPM) flag (intra_mpm_flag) may be signaled and an MPM index (intra_mpm_idx) or remaining mode indexes (intra_remainder) may be included. Accordingly, according to a syntax signaling method of FIG. 26, a bit for representing an intra prediction mode may be saved.

The normal intra prediction mode denotes a prediction mode using a directional prediction mode during intra prediction. The prediction according to the normal intra prediction mode may be performed together with an intra prediction tool or post-processing tool that does not separately require a flag indicating usage, like position dependent intra prediction combination (PDPC) or interpolation filtering.

An intra prediction tool other than the normal intra prediction mode denotes intra prediction to which prediction tools, such as ISP, MIP, MRL, and IBC expanded from directional intra prediction, are applied together, and generally, a flag indicating usage of an intra prediction tool may be separately present.

FIG. 27 illustrates pseudo-code for defining intra prediction when an index for indicating an on/off state of remaining intra prediction modes other than a normal intra prediction mode is present, according to another example embodiment.

The video decoding apparatus 1900 according to an example embodiment may obtain an intra prediction tool index by using a correlation of intra prediction tools, when a prediction mode is not a normal intra prediction mode.

For example, when an intra sub-block partitioning (ISP) tool and a multiple reference line prediction (MRL) tool are combined, combinations 00, 01, 10, and 11 of bits each indicating enabling of ISP/MRL may be indexed. Accordingly, an enabled state of two or more intra prediction tools may be indicated by using an index of two or more bits instead of a flag of one bit. When there is the correlation between the intra prediction tools (for example, a relationship where, when a specific tool is enabled, the other tool is unconditionally enabled or disabled, or the like), index candidates may be reduced, and thus the number of bits for representing the index may also be reduced. As another example, the number of signaled bits may be saved by applying a context model to an index of an often selected combination.

The video encoding apparatus 2100 may combine an index indicating enabling of all tools when there are several intra prediction tools, and use a combined index indicating usage of the tools, thereby applying a combined index method only when the number of bits indicating the combined index is reduced.

For example, it is difficult to use a matrix based intra prediction (MIP) tool, an ISP tool, an MRL tool, and an intra quantized residual differential pulse coded modulation (RDPCM) tool together. Accordingly, a flag indicating usage of MIP may be independently signaled, and indexes indicating usage of remaining tools may be combined and fixed length coding (FLC) may be performed on the indexes.

As another example, priorities of intra prediction tools may be determined and a combined index of the intra prediction tools may be signaled via a truncated binary coding method.

Referring to FIG. 27, when a flag 2710 indicating whether prediction is performed in a normal intra prediction mode is first defined and the prediction according to the normal intra prediction mode is performed, only information 2720 for determining an intra prediction direction may be signaled without having to transmit a combined index 2740 indicating usage of another intra prediction tool. When the prediction according to the normal intra prediction mode is not performed, the combined index 2740 indicating the usage of the other intra prediction tool may be signaled.

FIG. 28 illustrates block sizes allowed to perform intra prediction, for each of various intra prediction modes.

Block size restriction as shown in FIG. 28 is present for intra prediction tools used in the current VVC standard. Because it needs to be verified whether a block size is within a restricted size range before each intra prediction tool is performed, an operation burden may be increased.

A method for reducing processes by which the video encoding apparatus 2100 and video decoding apparatus 1900 according to an example embodiment verify a block size for an intra prediction tool is proposed with reference to FIGS. 29, 30, and 31.

FIG. 29 illustrates pseudo-code for restricting a block size at once, before an intra prediction mode is determined, according to an example embodiment.

A largest block size where an intra prediction tool is allowed may be unified to 64×64. In this case, a current block size and a block size restriction are not required to be compared whenever it is determined whether to perform each intra prediction tool. In detail, according to FIG. 29, the video decoding apparatus 1900 may verify at once whether a height and width of a current block are each equal to or smaller than 64, immediately before information indicating usage of an intra prediction tool, such as ISP, MIP, MRL, or IBC, is encoded (if (width <=64 && height <=64)).

FIG. 30 illustrates pseudo-code for restricting a block intra size together with a normal intra prediction mode flag, according to another example embodiment.

According to FIG. 30, when a normal intra prediction mode flag (normal flag) is defined, it may be verified whether prediction according to an intra prediction mode is performed and whether a width and height of a current block are each equal to or smaller than 64, i.e., a largest size where an intra prediction tool is allowed.

FIG. 31 illustrates pseudo-code for restricting intra prediction to be performed only for a specific block size or less, according to another example embodiment.

According to an example embodiment of FIG. 31, intra prediction may be performed only when a size of a current block is equal to or less than a specific size, regardless of a dual tree mode or a single tree mode.

A method by which the video encoding apparatus 2100 and video decoding apparatus 1900 according to an example embodiment change coding tools when a constrained intra prediction mode is enabled, will be described below.

When the constrained intra prediction mode is enabled, existing coding tools may need to change so as to guarantee error resilience. For example, when the constrained intra prediction mode is applied, issues may occur regarding whether to process the current block as an inter block or an intra block, and how to use a reference sample when the current block is defined as an intra block.

First, a method of determining the reference sample will be described.

When a prediction mode of the current block is an intra prediction mode, a sample of a neighboring block needs to be used to perform intra prediction. However, when the constrained intra prediction mode is enabled and the neighboring block is a block reconstructed in an inter prediction mode, it may be determined that the neighboring block is not available. When a block reconstructed in an inter prediction mode and a block reconstructed in an intra prediction mode are mixed in the neighboring blocks, a sample of the block reconstructed in the intra prediction mode may be used as a reference sample for performing intra prediction of the current block.

There is a coding tool using a reference sample other than intra prediction. For example, post-reconstruction filtering, such as Hadamard transform domain filtering, may use the sample of the neighboring block of the current block for filtering. When the post-reconstruction filtering is performed while the constrained intra prediction mode is enabled and the neighboring block is a block reconstructed in the inter prediction mode, the neighboring block may be determined to be unavailable. When the block reconstructed in the inter prediction mode and the block reconstructed in the intra prediction mode are mixed in the neighboring blocks, the sample of the block reconstructed in the intra prediction mode may be used as a reference sample for performing the post-reconstruction filtering with respect to the current block.

Also, when a sample of an inter or intra neighboring block is available regardless of the constrained intra prediction mode and regardless of whether the neighboring block is the block reconstructed in the inter prediction mode or intra prediction mode, the post-reconstruction filtering for the current block may be performed by using a reconstructed sample of the neighboring block.

According to an example embodiment, the video encoding apparatus 2100 and video decoding apparatus 1900 may perform prediction according to a combined inter and intra prediction (CIIP) mode while the constrained intra prediction mode is enabled as follows.

When the constrained intra prediction mode is enabled and the neighboring blocks are all blocks reconstructed in the inter prediction mode, the CIIP mode may be disabled to save bits for signaling a flag indicating application of the CIIP mode and a related index. As another example, when the neighboring blocks of the current block are all reconstructed in the intra prediction mode, it may be restricted to determine whether to use the CIIP mode.

When the neighboring block is reconstructed in the CIIP mode, the neighboring block is considered to be a block reconstructed in the inter prediction mode and defined to be an unavailable block. As another example, it may be determined whether to define the neighboring block to be a block reconstructed in the inter prediction mode or a block reconstructed in the intra prediction mode, according to an inter/intra weight of the neighboring block reconstructed in the CIIP mode. In detail, when the intra weight is 3 and the inter weight is 1, the neighboring block may be defined to be a block reconstructed in the intra prediction mode and determined to be an available block.

As another example, the neighboring block reconstructed in the CIIP mode may be determined to be a block reconstructed in the intra prediction mode. In this case, a boundary of the neighboring block may be filtered at a same boundary filtering strength (BS) as a block reconstructed in the intra prediction mode, during a deblocking filtering process. In detail, as in the HEVC standard, the boundary filtering strength at the boundary of the neighboring block reconstructed in the CIIP mode may be set to 2.

Meanwhile, the embodiments of the disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. A machine-readable storage medium may be provided in a form of a non-transitory storage medium. Here, the 'non-transitory storage medium' only denotes a tangible device and does not contain a signal (for example, electromagnetic waves). This term does not distinguish a case where data is stored in the storage medium semi-permanently and a case where the data is stored in the storage medium temporarily. For example, the 'non-transitory storage medium' may include a buffer where data is temporarily stored.

Other examples of the medium include recording media and storage media managed by application stores distributing applications or by websites, servers, and the like supplying or distributing other various types of software.

According to an example embodiment, a method according to various embodiments disclosed in the specification may be provided by being included in a computer program product. The computer program products are products that can be traded between sellers and buyers. The computer program product may be distributed in a form of machine-readable storage medium (for example, a compact disc read-only memory (CD-ROM)), or distributed (for example, downloaded or uploaded) through an application store (for example, Play Store™) or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

While one or more embodiments of the present disclosure have been described with reference to the figures, it will be understood by those of ordinary skill in the art that various changes in form and details may be made therein without departing from the spirit and scope as defined by the following claims.

What is claimed:

1. A video decoding method comprising:
obtaining, from a bitstream, information indicating whether a constrained intra prediction mode is used or not;
when the constrained intra prediction mode is used for a current block, generating predicted samples of the current block using samples of a first neighboring block decoded using an intra prediction mode without using samples of a second neighboring block decoded using an inter prediction mode, wherein the first neighboring block is predicted in the intra prediction mode using samples of at least one neighboring block included in a picture including the first neighboring block;
generating reconstructed samples of the current block based on the predicted samples of the current block and residual samples of the current block;
when the constrained intra prediction mode is used for the current block and a prediction mode of a third neighboring block is not the intra prediction mode, determining a padding value for a position corresponding to the third neighboring block, using a reconstructed sample of the current block adjacent to the boundary between the current block and the third neighboring block among the reconstructed samples of the current block;
performing post-reconstruction filtering on the reconstructed samples of the current block using the padding value to generate updated reconstructed samples of the current block; and
performing an in-loop filtering on the updated reconstructed samples of the current block generated by the post-reconstruction filtering, the in-loop filtering including at least one of a deblocking filtering and an adaptive loop filtering (ALF).

2. A video encoding method comprising:
generating information indicating whether a constrained intra prediction mode is used or not;
when the constrained intra prediction mode is used for a current block, generating predicted samples of the current block using samples of a first neighboring block encoded using an intra prediction mode without using samples of a second neighboring block encoded using an inter prediction mode, wherein the first neighboring block is predicted in the intra prediction mode using samples of at least one neighboring block included in a picture including the first neighboring block;
generating reconstructed samples of the current block based on the predicted samples of the current block and residual samples of the current block;
when the constrained intra prediction mode is used for the current block and a prediction mode of a third neighboring block is not the intra prediction mode, determining a padding value for a position corresponding to a third neighboring block, using a reconstructed sample of the current block adjacent to the boundary between the current block and the third neighboring block among the reconstructed samples of the current block;

performing post-reconstruction filtering on the current block, based on the padding value to generate updated reconstructed samples of the current block, and performing an in-loop filtering on the updated reconstructed samples of the current block generated by the post-reconstruction filtering, the in-loop filtering including at least one of a deblocking filtering and an adaptive loop filtering (ALF).

3. A method of transmitting a bitstream generated by encoding a video, the method comprising:

generating information indicating whether a constrained intra prediction mode is used or not;

when the constrained intra prediction mode is used for a current block, generating predicted samples of the current block using samples of a first neighboring block encoded using an intra prediction mode without using samples of a second neighboring block encoded using an inter prediction mode, wherein the first neighboring block is predicted in the intra prediction mode using samples of at least one neighboring block included in a picture including the first neighboring block;

generating reconstructed samples of the current block based on the predicted samples of the current block and residual samples of the current block;

when the constrained intra prediction mode is used for the current block and a prediction mode of a third neighboring block is not the intra prediction mode, determining a padding value for a position corresponding to a third neighboring block, using a reconstructed sample of the current block adjacent to the boundary between the current block and the third neighboring block among the reconstructed samples of the current block;

performing post-reconstruction filtering on the current block, based on the padding value to generate updated reconstructed samples of the current block and performing an in-loop filtering on the updated reconstructed samples of the current block generated by the post-reconstruction filtering, the in-loop filtering including at least one of a deblocking filtering and an adaptive loop filtering (ALF); and transmitting a bitstream including the information indicating whether the constrained intra prediction mode is used or not.

\* \* \* \* \*